(12) United States Patent
Casey et al.

(10) Patent No.: US 7,793,003 B2
(45) Date of Patent: Sep. 7, 2010

(54) SYSTEMS AND METHODS FOR INTEGRATING MICROSERVERS WITH A NETWORK INTERFACE DEVICE

(75) Inventors: Steven M. Casey, Littleton, CO (US); Bruce A. Phillips, Erie, CO (US); Donald Brodigan, Broomfield, CO (US); Kurt A. Campbell, Lafayette, CO (US)

(73) Assignee: Qwest Communications International Inc, Denver, CO (US)

( * ) Notice: Subject to any disclaimer, the term of this patent is extended or adjusted under 35 U.S.C. 154(b) by 1378 days.

(21) Appl. No.: 10/624,454

(22) Filed: Jul. 21, 2003

(65) Prior Publication Data

US 2004/0177163 A1    Sep. 9, 2004

Related U.S. Application Data

(63) Continuation-in-part of application No. 10/367,597, filed on Feb. 14, 2003, now Pat. No. 7,433,465, which is a continuation-in-part of application No. 10/356,364, filed on Jan. 31, 2003, now Pat. No. 7,180,988, and a continuation-in-part of application No. 10/356,688, filed on Jan. 31, 2003, now Pat. No. 7,454,006, and a continuation-in-part of application No. 10/356,338, filed on Jan. 31, 2003, now abandoned, application No. 10/624,454, which is a continuation-in-part of application No. 10/444,941, filed on May 22, 2003, which is a continuation-in-part of application No. 10/367,597, filed on Feb. 14, 2003, now Pat. No. 7,433,465.

(51) Int. Cl.
G06F 15/16    (2006.01)

(52) U.S. Cl. .............. 709/249; 709/203; 709/250
(58) Field of Classification Search .............. None
See application file for complete search history.

(56) References Cited

U.S. PATENT DOCUMENTS

| 5,202,765 A | 4/1993 | Lineberry |
| 5,694,616 A * | 12/1997 | Johnson et al. ............. 709/207 |
| 5,740,075 A | 4/1998 | Bigham et al. |

(Continued)

OTHER PUBLICATIONS

Frank, Edward and Holloway, Jack; "Connecting the Home with a Phone Line Network Chip Set", IEEE Micro, Mar.-Apr. 2000, pp. 2-14.

(Continued)

*Primary Examiner*—Rupal D Dharia
*Assistant Examiner*—Van Kim T Nguyen

(57) ABSTRACT

A network interface device has an isolation device adapted to isolate a transport medium internal to a customer premises from a transport medium external to the customer premises such that operational changes to one of the internal and external transport media do not affect the other of the internal and external transport media. A first interface is coupled with the isolation device and adapted to communicate with the external transport medium, which is in communication with a distribution point. A second interface is coupled with the isolation device and adapted to communicate with the internal transport medium. A microserver is disposed external to the customer premises and coupled with the first and second interfaces. The microserver is adapted to receive telecommunication information from the external transport medium and includes software for implementing a predetermined function over the internal transport medium by processing the received telecommunication information.

20 Claims, 23 Drawing Sheets

U.S. PATENT DOCUMENTS

| | | | |
|---|---|---|---|
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,070,127 A * | 5/2000 | Hirono et al. | 702/27 |
| 6,134,320 A | 10/2000 | Swan et al. | |
| 6,209,025 B1 | 3/2001 | Bellamy | |
| 6,212,585 B1 * | 4/2001 | Chrabaszcz | 710/302 |
| 6,282,189 B1 | 8/2001 | Eames | |
| 6,463,273 B1 | 10/2002 | Day | |
| 6,526,581 B1 | 2/2003 | Edson | |
| 6,738,820 B2 * | 5/2004 | Hilt | 709/229 |
| 6,745,021 B1 | 6/2004 | Stevens | |
| 6,760,782 B1 * | 7/2004 | Swales | 709/250 |
| 6,816,878 B1 | 11/2004 | Zimmers et al. | |
| 6,842,628 B1 | 1/2005 | Arnold et al. | |
| 6,896,276 B1 * | 5/2005 | Sparrow | 280/276 |
| 6,909,903 B2 | 6/2005 | Wang | |
| 6,934,753 B2 * | 8/2005 | Kim | 709/225 |
| 6,948,076 B2 * | 9/2005 | Saito | 726/12 |
| 6,957,275 B1 * | 10/2005 | Sekiguchi | 709/245 |
| 6,978,474 B1 * | 12/2005 | Sheppard et al. | 725/83 |
| 7,010,608 B2 * | 3/2006 | Garg et al. | 709/229 |
| 7,035,270 B2 * | 4/2006 | Moore et al. | 370/401 |
| 7,233,781 B2 | 6/2007 | Hunter et al. | |
| 7,248,563 B2 * | 7/2007 | Bhogal et al. | 370/230 |
| 7,263,362 B1 * | 8/2007 | Young et al. | 455/450 |
| 7,264,590 B2 * | 9/2007 | Casey et al. | 600/300 |
| 7,283,045 B1 | 10/2007 | Manz | |
| 2002/0171552 A1 | 11/2002 | Tate | |
| 2003/0026416 A1 | 2/2003 | Fusco | |
| 2003/0069002 A1 | 4/2003 | Hunter et al. | |
| 2003/0072330 A1 | 4/2003 | Yang et al. | |
| 2003/0226143 A1 | 12/2003 | Michael et al. | |
| 2006/0020992 A1 | 1/2006 | Pugel et al. | |
| 2006/0031582 A1 | 2/2006 | Pugel et al. | |

OTHER PUBLICATIONS

U.S. Appl. No. 10/675,429, Office Action dated Apr. 13, 2010, 34 pages.

* cited by examiner

SYSTEMS AND METHODS FOR INTEGRATING MICROSERVERS WITH A NETWORK INTERFACE DEVICE

CROSS-REFERENCES TO RELATED APPLICATIONS

This application is a continuation-in-part of U.S. patent application Ser. No. 10/367,597, entitled "SYSTEMS AND METHODS FOR PROVIDING TELECOMMUNICATIONS SERVICES VIA A NETWORK INTERFACE DEVICE," filed Feb. 14, 2003 by Steven M. Casey et al. ("the '597 application"), the entire disclosure of which is herein incorporated by reference for all purposes. The '597 application is a continuation-in-part application of U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; is a continuation-in-part application of U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al; and is a continuation-in-part application of U.S. patent application Ser. No. 10/356,338, entitled "CONFIGURABLE NETWORK INTERFACE DEVICE AND SYSTEMS AND METHODS FOR ITS USE," filed Jan. 31, 2003 by Bruce A. Phillips et al., the entire disclosure of each of which is herein incorporated by reference for all purposes.

This application is also a continuation-in-part of U.S. patent application Ser. No. 10/444,941, entitled "SYSTEMS AND METHODS FOR PROVIDING TELEVISION SIGNALS USING A NETWORK INTERFACE DEVICE," filed May 22, 2003 by Bruce A. Phillips et al., which is a continuation-in-part of the '597 application and which is incorporated herein by reference in its entirety for all purposes.

This application is also related to the following applications, the entire disclosure of each of which is incorporated herein by reference for all purposes: U.S. patent application Ser. No. 10/377,283, filed Feb. 27, 2003; U.S. patent application Ser. No. 10/377,290, filed Feb. 27, 2003; U.S. patent application Ser. No. 10/377,282, filed Feb. 27, 2003; U.S. patent application Ser. No. 10/377,281, filed Feb. 27, 2003; U.S. patent application Ser. No. 10/377,584, filed Feb. 27, 2003; U.S. patent application Ser. No. 10/377,280, filed Feb. 27, 2003; U.S. patent application Ser. No. 10/391,518, filed Mar. 17, 2003; U.S. patent application Ser. No. 10/448,249, filed Mar. 29, 2003; U.S. patent application Ser. No. 10/445,275, filed May 23, 20003; and U.S. patent application Ser. No. 10/452,996, filed Jun. 30, 2003.

BACKGROUND OF THE INVENTION

In the past, there has been a lack of consistent interface between telecommunication service providers' networks and their customers' premises wiring. For instance, telephone service often has been hard-wired to the customer's premises wiring by a variety of methods, rendering service calls unnecessarily complicated and intrusive. Such services calls often required service personnel to enter the customer premises, creating logistical issues for the telecommunication service provider and increasing customer frustration. Moreover, the lack of any discrete interface between the customer's premises wiring and the provider's network sometimes forced the use of proprietary hardware from the customer's perspective and limited the provider's flexibility when considering options to upgrade or otherwise modify the network.

This problem has been exacerbated by the increased number of telecommunication services provided to customer premises. For instance, many telecommunication service providers now provide xDSL service to their customers, but those skilled in the art will recognize that there is little (if any) standardization among providers. Thus, implementations vary widely, each requiring different hardware and software configurations to be operable, and customers have little flexibility in choosing hardware. For instance, ADSL service frequently is deployed differently than VDSL service, and ADSL deployments themselves can vary from provider to provider. Likewise, telephone wiring schemes can vary widely among customer premises, requiring different types of hardware to enable and enhance services, such as filters to control interference, and the like. Further, a typical customer premises has multiple wiring networks, including one for video distribution (cable, satellite, VDSL, and the like), one for data distribution (Ethernet or the like, perhaps with a connection to an xDSL modem or cable modem), and another for telephone service, and these networks generally operate independently of one another. And if a customer wants to add a new telecommunication service, an expensive service call (often including one or more new cable drops and/or the installation of new premises wiring) likely will be required.

Accordingly, there is a need in the art for methods and systems to address these and other problems.

BRIEF SUMMARY OF THE INVENTION

Embodiments of the invention thus provide methods and systems for providing telecommunication information to a transport medium internal to a customer premises. In one set of embodiments, a network interface device is provided. The network interface device comprises an isolation device adapted to isolate the internal transport medium from a transport medium external to the customer premises such that operational changes to one of the internal and external transport media do not affect the other of the internal and external transport media. A first interface is coupled with the isolation device and adapted to communicate with the external transport medium, which is in communication with a distribution point. A second interface is coupled with the isolation device and adapted to communicate with the internal transport medium. A microserver is disposed external to the customer premises and coupled with the first and second interfaces. The microserver is adapted to receive telecommunication information from the external transport medium and includes software for implementing a predetermined function over the internal transport medium by processing the received telecommunication information.

In some such embodiments, the isolation device and microserver may be disposed within a common housing, which may be disposed on an exterior wall of the customer premises. In addition, the network interface device may comprise an addressable application device coupled with the microserver that is adapted to receive the processed telecommunication information and to execute a defined application as an aid to implementing the predetermined function over the internal transport medium. The addressable application device may be disposed external to the customer premises and may be disposed within a common housing with the isolation device and microserver.

A variety of different microservers may be used in different embodiments. For example, in one embodiment, the microserver may comprise an authentication microserver adapted to verify that the predetermined function is authorized for the customer premises. In another embodiment, the microserver comprises a file-transfer microserver adapted to transfer an electronic file of information to or from the network interface device. In a further embodiment, the microserver comprises a dynamic host configuration protocol microserver adapted to manage an internet-protocol address assignment to a device coupled with the internal transport medium; the internet-protocol address assignment may comprise a private internet-protocol address assignment or may comprise a public internet-protocol address assignment. In another embodiment, the microserver comprises a code-processing microserver adapted to receive code and process the code for use by another component of the network interface device; in addition, the microserver may further comprise a webserver microserver adapted to render a display of incoming web-page information suitable for presentation with a web-browser enabled device. In some instances, the microserver may comprise an email alert microserver adapted to initiate an alert in response to receipt of an email message at an email account. The microserver may alternatively comprise an instant-messenger microserver adapted to provide instant-messaging functionality over the internal transport medium. In one embodiment, the microserver comprises a webserver microserver and an advertising microserver. The webserver microserver is adapted to render a display of web-page information suitable for presentation with a web-browser enabled device and an advertising microserver adapted to overlay an advertisement over the display of web-page information. The microserver may comprise a wireless microserver adapted to provide an interface between wireless communications within the customer premises to the external transport medium. In another embodiment the microserver comprises an RF power-level microserver adapted to monitor an RF power level of telecommunication information received at the first interface. In a further embodiment, the microserver comprises a test-access microserver adapted to verify proper functioning of another component of the network interface device. In still another embodiment, the network interface device further comprises a webserver microserver coupled with the microserver and adapted to provide a customer-based graphical user interface for implementing software configuration changes of the microserver.

In a second set of embodiments, a method provides telecommunication information to a transport medium internal to a customer premises. The internal transport medium is isolated from a transport medium external to the customer premises such that operational changes to one of the internal and external transport media do not affect the other of the internal and external transport media. The telecommunication information is received from the external transport medium and is selectively processed with a microserver disposed external to the customer premises. Thereafter, a predetermined function is implemented over the internal transport medium with the processed telecommunication information.

In some instances, the method may further comprise transmitting the processed telecommunication information to an addressable application disposed external to the customer premises. The predetermined function may then be implemented by implementing an application over the internal transport medium with the addressable application device.

There are a variety of ways in which the received telecommunication information may be selectively processed in different embodiments. For example, in one embodiment it is verified that the predetermined function is authorized for the customer premises. In another embodiment, an electronic file of information is transferred. In a further embodiment, an internet-protocol address assignment to a device coupled with the internal transport medium is managed. In a different embodiment, code is received and processed for use in implementing the predetermined function; in some such instances, a display of incoming web-page information is rendered to be suitable for presentation with a web-browser enabled device. In some cases, an alert is initiated in response to receipt of an email message at an email account. In other cases, instant-messaging functionality is provided over the internal transport medium. In a particular embodiment, a display of web-page information is rendered suitable for presentation with a web-browser enabled device and an advertisement is overlaid over the display. In another embodiment, an interface between wireless communications within the customer premises to the external transport medium is provided. In a further embodiment, an RF power level of the telecommunication information received from the external transport medium is monitored. In still another embodiment, a customer-based graphical user interface is provided for implementing configuration changes of software governing how the received telecommunication information is selectively processed.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a capital-letter sublabel is associated with a reference numeral and follows a hyphen to denote one of multiple similar components. When reference is made to a reference numeral without specification to an existing sublabel, it is intended to refer to all such multiple similar components.

FIGS. 3A-3K provide illustrations of various microserver arrangements that may be used by a network interface system to provide a variety of telecommunications services to a customer premises according to embodiments of the invention.

DETAILED DESCRIPTION OF THE INVENTION

1. Introduction

Figure 1A:
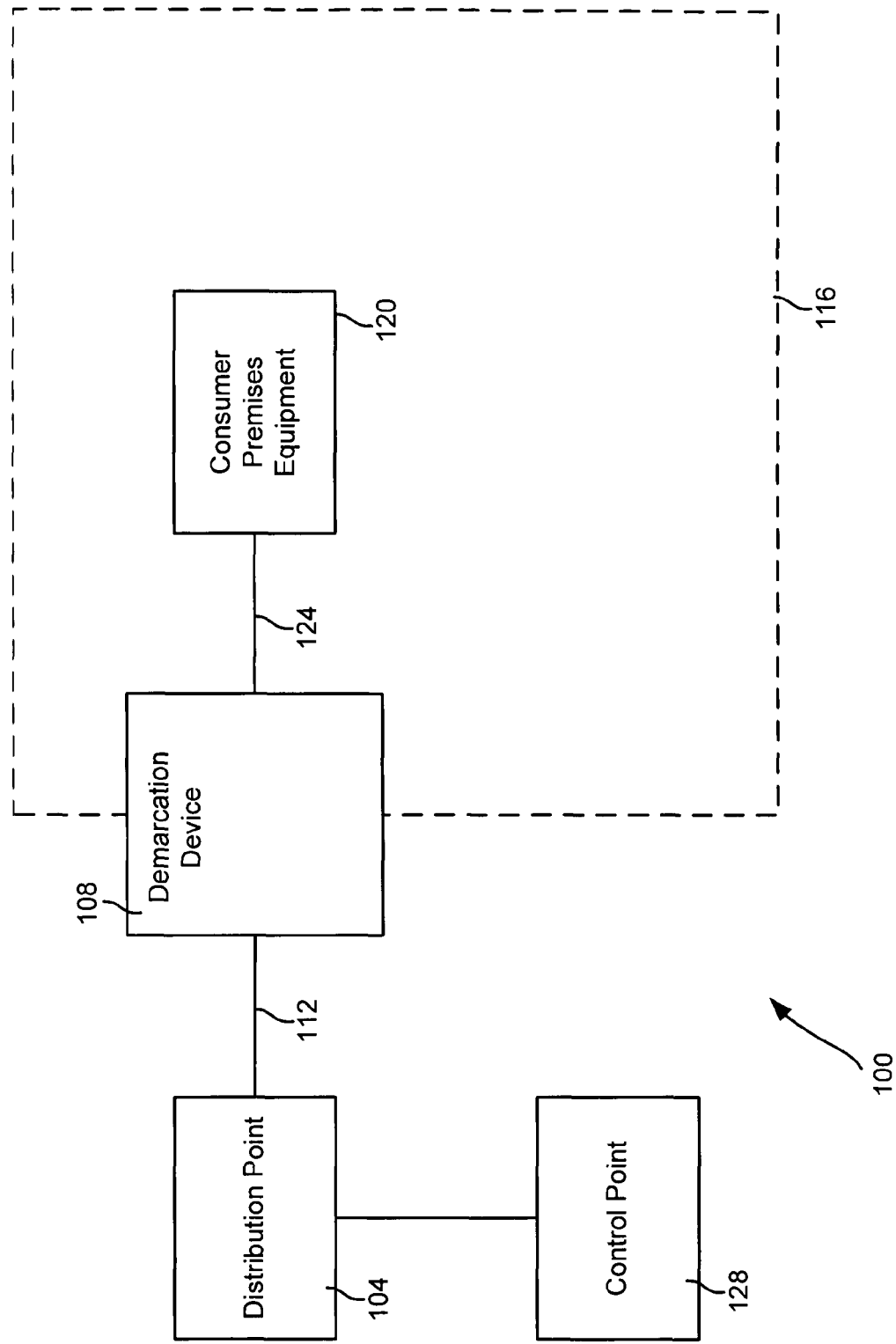
FIGS. 1A-1G provide schematic illustrations of configurations for network interface devices used in embodiments of the invention.

Embodiments of the invention are directed to methods and systems for providing telecommunications services by integrating one or more microservers with a network interface device. As used herein, a "microserver" is intended to refer to any device that uses a combination of software and hardware to meet a predefined need. For example, a microserver may be programmed to perform a specified limited set of functions and may take a structural form such as an erasable programmable read-only memory ("EPROM") device, electrically erasable programmable read-only memory ("EEPROM") device, programmable logic device ("PLD"), erasable programmable logic device ("EPLD"), complex programmable logic device ("CPLD"), field-programmable gate array ("FPGA"), and the like. The scope of telecommunications services that may be provided is broad, and several specific examples of services that may be provided by integrating one or more microservers with a network interface device are discussed in greater detail below.

In embodiments of the invention, the telecommunications services may be provided through the use of a network interface system that is capable of interfacing between a customer premises and a telecommunication service provider's network. In some instances such an interfacing capability is performed by elements of a "demarcation device," and specific examples of how the demarcation capabilities arise in different embodiments of the network interface systems are discussed below. Merely by way of illustration, such demarcation capabilities may derive from elements comprised by the following examples of demarcation devices: a set-top box, which may be used inter alia as an interface between a customer's video appliance and a provider's video network; broadband modems, including xDSL modems, cable modems, and wireless modems, each of which may be used to provide video and/or data to a customer premises; integrated access devices, which may, for example, translate between Voice over IP ("VoIP") signals and traditional telephone signals, allowing traditional telephones to connect to a VoIP network; devices compatible with the session initiation protocol ("SIP"); and the like. One particular demarcation device whose elements may be used to provide demarcation capabilities includes a network interface device ("NID"), described in detail below. In some instances, a demarcation device may additionally include other capabilities, including, for example, the capability to separate received telecommunication information into discrete sets; the capability to process certain of the separated sets independently from other sets; and/or the capability to transmit different of the separated sets to different locations, perhaps through the use of different interfaces. Integration of one or more microservers with the NID has significant advantages when compared with solutions in which microservers are separate from the NID. For instance, separate microservers may require access to a customer premises for services and may be moved around and removed from the customer premises. By integrating the microservers with the NID, they are easily accessible by a technician and may be integrated in a secure fashion as described below that makes them nonremovable by others.

In describing embodiments of the invention, references to "customer premises" are intended to refer to physical structures under the control of a customer through ownership, leasehold, or any other property right. The term is not intended to encompass open real property external to the physical structures, even if such open real property is also under the control of the customer. Such a definition reflects differences in accessibility to the physical structures and surrounding open real property. Access to the physical structures generally requires the presence of the customer or a representative of the customer, while access to the surrounding open real property may be obtained by permission from customer, through an easement, or by other means that does not require the physical presence of the customer. Thus, for example, in the case of a residential customer, the customer premises may correspond to the customer's home, but does not include the yard surrounding the home. Access to the yard may be obtained even when the customer is not home, such as when the customer is at work, is shopping, or is otherwise unavailable to be physically present.

As used herein, the term "telecommunication information" is broadly defined to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC, PAL, and SECAM formatting, as well as, for example any of the MPEG digital encoding and/or compression algorithms), and data. Such data can be formatted according any of a variety of protocols familiar in the art, including in particular the Internet Protocol.

In this application, the term "telecommunication service provider" refers to any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is intended to describe a discrete subset of the telecommunication information transmitted across a particular transport medium and/or received by a device having demarcation capabilities. Generally, the telecommunication information that is classified part of a particular information set shares a common characteristic. Merely by way of example, an information set can comprise telecommunication information of a particular type, such as voice, IP data, encoded video, and such; information associated with a particular application, such as information assigned to a specific IP port, as is known in the art; information addressed to or received from a particular device or network segment; information received within a particular reception window; and the like.

In certain embodiments, demarcation capabilities can support the one-way flow of telecommunication information, such as exemplified by the case of a simple set top box, which can receive data representing a video signal, decode that data, and transmit a video signal to an attached television. In other embodiments, demarcation capabilities can support bidirectional flow of telecommunication information. One such example is an xDSL modem, which allows the transmission of data both to and from a customer premises. In still other embodiments, the demarcation capability can support both unidirectional and bidirectional information flows simultaneously, depending on the type of telecommunication information transmitted or the source of the information.

The demarcation capabilities may also function to isolate the telecommunication service provider's network from the network at the customer premises. As described in detail below, the service provider's network is one example of an "external transport medium" and the customer's network is one example of an "internal transport medium." The external transport medium and internal transport medium are each examples of a "transport medium," which is used herein to describe any cable, wire, or other medium capable of carrying telecommunication information, including, but not limited to, twisted pair copper wiring (shielded or unshielded, including, for example, unshielded cables complying with industry-standard categories 3, 5, 5e and 6), optical fiber, and coaxial cable. Other examples of transport media include universal serial bus ("USB") cable, cable complying with the Institute of Electrical and Electronics Engineers' ("IEEE") 1394 standard, as well as any medium capable of complying with the many local-area networking standards known in the art. The preceding are examples of transport media that comprise physical media, but the invention is not limited to the use of physical media. In other embodiments, a transport medium may comprise any of a wide variety of wireless transmissions, including infra-red transmissions, radio frequency ("RF") transmissions, and transmissions complying with standards developed by any of the IEEE's working groups governing wireless communication (e.g., the 802.11, 802.15, 802.16 and 802.20 working groups), as well as point-to-point microwave, satellite, cellular/PCS, and/or ultra wideband transmissions, among others.

In certain embodiments, demarcation capabilities can define an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media, and/or other operational parameters of a network. This isolation feature can provide many benefits; for instance, the demarcation capability can be realized by a disclosed interface between a customer premises and a provider's network, allowing the provider to implement changes in its network without disrupting the service provided to the customer.

Likewise, the isolation of the internal transport medium from the external transport medium can allow for any variety of customer premises equipment ("CPE") to be used at the customer premises without fear that the equipment might be incompatible with a particular telecommunication service provider's standards. "Customer premises equipment" and "CPE" are intended to refer to any device that sends, receives, or otherwise utilizes telecommunication information. Moreover, the demarcation capabilities might serve to couple a plurality of external and/or internal transport media, allowing interoperation among them all, and to provide the same isolation features among all of these media.

In this way, certain aspects of the demarcation capabilities can allow for sales of a wide variety of CPE on a consumer electronics model, instead of the proprietary model necessitated by many of today's telecommunication networks, where, for example, differing implementations of xDSL among providers virtually force consumers to purchase modems from the providers to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits result from embodiments of the invention.

In accordance with other embodiments, the isolation abilities also allow insulation between different transport media coupled to the internal and external transport media in order. This may permit, for example, preventing unwanted telecommunication information of one network from entering the other network. For instance, a demarcation capability of a network interface system in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation capabilities can prevent the contamination of the internal transport medium with unwanted information from the external medium, interference between two or more external transport media coupled, and unwanted interference or crosstalk between multiple internal media.

In some embodiments, the isolation of the internal transport medium from the external transport medium resulting from the demarcation capabilities also allows enhanced security to be provided for the customer and/or to control customer access to certain features or services. For instance, those skilled in the art will recognize that demarcation capabilities can prevent unauthorized access to the customer's data network, such as by a telecommunication service provider and/or a third party, or can screen or filter telecommunication information entering or leaving the customer's premises. This enables features such as parental controls to be placed on incoming and outgoing information, as well as filtering of outgoing sensitive information, such as credit card information and the like.

Further, according to certain embodiments, the demarcation capabilities may be used to define a consolidation point for all telecommunication information entering or leaving the customer premises. Definition of such a consolidation point permits a variety of enhanced features to be provided to the entire premises, including features such as caller identification, premises-wide telephone, video and data distribution, content on demand, including video, audio, and/or data on demand, and the like. These and other features resulting from demarcation capabilities also allow for a variety of new and useful telecommunication applications to be provided to customers. Specific details of some exemplary applications are discussed below; given the disclosure herein, those skilled in the art can appreciate the wide variety of such applications that are possible using various embodiments of the invention.

In a number of embodiments, the demarcation capability is applied specifically to a customer premises, thereby separating a transport medium internal to the customer premises from a transport medium external to the customer premises. Moreover, the demarcation is exploited to provide one or more microservers in a configuration that permits services to be provided in accordance with the programming of the microservers to the entire premises. In addition, in some instances one or more addressable application devices may also be provided such as described in the '597 application, with the microservers programmed to interact in combination with the application devices to provide the specified services. For example, the addressable application devices may be adapted to interface with the transport medium internal to the customer premises, and the microservers may be adapted to selectively process telecommunication information originating from the transport medium external to the customer premises. Applications may be implemented through transmission of the processed telecommunication information from the processors to the addressable application devices.

2. Organizational Configurations

There are numerous organizational configurations for the NID that may be used in accordance with embodiments of the invention. Several examples are shown schematically in FIGS. 1A-1G, although such examples are not intended to be exhaustive. A relatively simple arrangement is shown in FIG. 1A, which includes a distribution point 104 in communication with a device 108 having demarcation capabilities via an external transport medium 112. In this example, the external transport medium 112 comprises a transport medium external to a customer premises 116. The device 108 is adapted to interface with an internal transport medium 124. In this example, the internal transport medium 124 comprises a transport medium internal to the customer premises 116.

In one sense, the distribution point 104 may be considered to be a source of telecommunication information transmitted to the customer premises and a recipient of telecommunication information transmitted from the customer premises; as described below, however, the distribution point 104 need not be either the ultimate source nor the ultimate recipient of telecommunication information. In certain embodiments, the distribution point 104 may correspond to a telecommunication service provider's local office. In other embodiments, the distribution point may correspond to another network element in the service provider's network, such as a remote termination cabinet and/or a digital subscriber line access multiplier ("DSLAM"). More generally, the distribution point 104 may correspond to any facility operated by a telecommunication service provider that is capable of transmitting telecommunication information to, and/or receiving telecommunication information from, a customer premises 116.

In general, distribution points can be classified, inter alia, as discrete distribution points or complex distribution points. With respect to a particular information set, a discrete distribution point often transmits only the necessary or desired information to the NID. In contrast, a complex distribution point can transmit the entire information set to the NID. The contrast may be illustrated with regard to video distribution: A discrete distribution point may perform channel switching (at the request of the demarcation device 108), encoding and sending only the desired channel information to the demarcation device 108. In contrast, a complex distribution point might rely upon the demarcation device 108 to perform all channel switching. Those skilled in the art will appreciate that each scheme presents relative advantages and disadvantages.

Distribution point 104 can be capable of transmitting and/ or receiving any type of telecommunication information to/from the NID, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises 116 (perhaps via a NID at each customer premises) and often is neither the ultimate source nor the ultimate recipient of telecommunication information. Instead, distribution point 104 usually serves as an intermediary between one or more customer premises 116 and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises 116 and any source and/or recipient of telecommunication information that has a connection to the Internet. The interconnection of telecommunication networks is well known in the art, although it is specifically noted that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment, as described in the applications referenced above. In other embodiments, distribution point 104 can be in communication with one or more other customer locations, allowing for private virtual circuits, vlan tags and wavelengths, or rf connections between customer premises 116 and those locations.

In configuration 100, the NID can serve as the interface between external transport medium 112 and customer premises 116. As shown in FIG. 1A, usually the demarcation device 108 comprised by the NID is interfaced with both the internal transport medium 124 and with the external transport medium 112. As conceptually illustrated in FIG. 1A, demarcation device 108 may be attached to an external wall of the customer premises 116. Such a configuration provides many advantages. For instance, if the telecommunication service provider desires to upgrade or otherwise change its network, including, perhaps, external transport medium 112, a technician can perform any necessary changes at demarcation device 108 as appropriate without entering the customer premises. Coupled with the ability of some demarcation devices 108 to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises 116. Of course, demarcation device 108 may be located at a variety of alternative locations, either within customer premises 116 or at a facility operated by the telecommunication service provider. In addition, as previously noted and as discussed in further detail below, a NID may also be divided, with different portions situated at different locations, according to the requirements of the implementation.

The NID is configured so that it may communicate with CPE 120, which may be located interior to the customer premises through internal transport medium 124. Such communication is used to implement functionality defined by microservers comprised by NID over the CPE 120 in accordance with telecommunication information received from the distribution point 104. In addition, the demarcation device 108 may communicate directly with CPE 120 to implement other functions. While the internal transport medium 124 may comprise any of the media discussed above, in one embodiment it comprises existing telephone wiring in customer premises 116 and, in some embodiments, is capable of carrying voice, data and video information. For instance, as described in Edward H. Frank and Jack Holloway, "Connecting the Home with a Phone Line Network Chip Set," *IEEE Micro* (IEEE, March-April 2000), which is incorporated herein by reference, the Home Phoneline Networking Alliance ("HPNA") standards allow for simultaneous transmission of both voice information and Ethernet frames across twisted-pair copper telephone wiring. In addition to the transmission of telecommunication information through the NID, telecommunication information may be transmitted via the reverse path to the distribution point 104. Such telecommunication information received at the distribution point 104 may be transmitted to an information recipient, such as a service provider. For example, such a transmission may be used to request a pay-per-view movie or the like. Alternatively, telecommunication information received at the distribution point 104 may be transmitted across the Internet, such as may be used in the case of sending an email message.

In certain embodiments, the NID can receive state information from a control point 128, which is shown in the illustrated embodiment as associated with distribution point 104. In certain instances, control point 128 can be software and/or hardware operated by a telecommunication service provider for controlling certain features of the operation of the NID. For instance, control point 128 can instruct the NID to provide (or cease to provide) particular applications and/or telecommunication services to the customer premises 116. Control point 128 can also provide other directions to the NID through the demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand.

Often, it may be beneficial to allow the customer to provide state information to the NID. Thus, in certain embodiments, control point 128 may have a web interface, such that the customer or any authorized person, such as an employee of the telecommunication service provider or telecommunication information provider, may log onto the web interface and configure options for the NID, perhaps resulting in state commands being transmitted from the distribution point 104 to the NID. In other embodiments, control point 128 can be a web interface to the NID itself, allowing the customer or other authorized person to configure the NID directly. In still other embodiments, control point 128 can communicate with the NID through an application programming interface ("API"). Hence, in some embodiments, control point 128 can interface with the NID through an API.

In many such embodiments, the API comprises a logical interface, in which case it may include a set of software, hardware, or firmware routines or libraries that may be invoked programmatically to configure or relay information to internal components of the NID. In that sense, then, control point 128 can be understood to be a program running on a computer, perhaps located at distribution point 104 or customer premises 116, among other locations, that provides state information to components of the NID via a software API. In other embodiments, the API comprises a physical interface to permit it to be accessed locally, such as by a service technician. For example, the service technician could visit property outside the customer premises 116, attach a laptop computer or other device to the physical interface, and upload information to the components of the NID, including perhaps both state information, as well as other telecommunication information. In still other embodiments, components of the NID can accept state information through other means, including, for example, through a web interface by receiving a specially formatted electronic message. This is especially the case in embodiments where one of the microservers comprised by the NID includes as a web server, as discussed below.

Those skilled in the art will appreciate that certain control methods are more well-suited to certain services than to others. For instance, with respect to cable television services, the same set of information may be broadcast to many households, and the NID is well-suited to control access to those services, allowing for greater efficiency in the providing of such services. In contrast, video on demand services may instead be controlled at a distribution point 104 or elsewhere such that a particular NID only receives video-on-demand information if the customer already has requested and been authorized to receive that service. In such cases, the NID may not need to provide access control functions with respect to that service.

According to some embodiments, the NID can implement either of these access control schemes, or both in combination, as well as others. Moreover, the NID can, in some cases, be configured to support a plurality of schemes transparently. For instance, the customer could request a service from the NID, perhaps using one of the methods discussed above, and the NID could relay that request to the appropriate telecommunication service provider and/or telecommunication information provider, as well as reconfigure itself to allow access to that service, if necessary. Of course, the NID can also be configured to take any necessary validating or authenticating action, such as notifying the distribution point 104 and/or control point 128 that the service has been requested, and, optionally, receiving a return confirmation that the service has been authorized.

In accordance with other embodiments, state information sent to the NID can include one or more commands to interface with a particular CPE in a certain way. For instance, state information could instruct the NID to turn on and/or off certain lights or equipment, perhaps via additional equipment, or to arm, disarm or otherwise monitor and/or configure a home security system. State information can also include operational data such as an IP address, routing information, and the like, to name but a few examples.

State information can further include instructions to modify one or more security settings of the NID. Merely by way of example, in certain embodiments, the NID can include a computer virus scanner, and state information can include updated virus definitions and/or heuristics. Likewise, the NID often will be configured with access controls, such as to prevent unauthorized access through the NID by third parties. State information can include instructions on how to deal with particular third-party attempts to access the NID or internal transport medium 124. Those skilled in the art will recognize as well that some security settings may specify the level of access the customer has to the functions of the NID, such as to prevent unauthorized use of certain telecommunication services, and that these settings also may be modified by received state information.

There are a variety of ways in which the various access-control and security functionalities of the NID discussed above may be implemented. In different embodiments, these functionalities may be performed by the demarcation device 108 and/or by other components such as some of the microservers described below that may additionally be comprised by the NID. Moreover, the state information that manages such functionalities may sometimes be sent periodically to the NID to ensure that it is current. Those skilled in the art will also recognize that state information can be considered a subset of the broader category of telecommunication information.

Figure 1B:
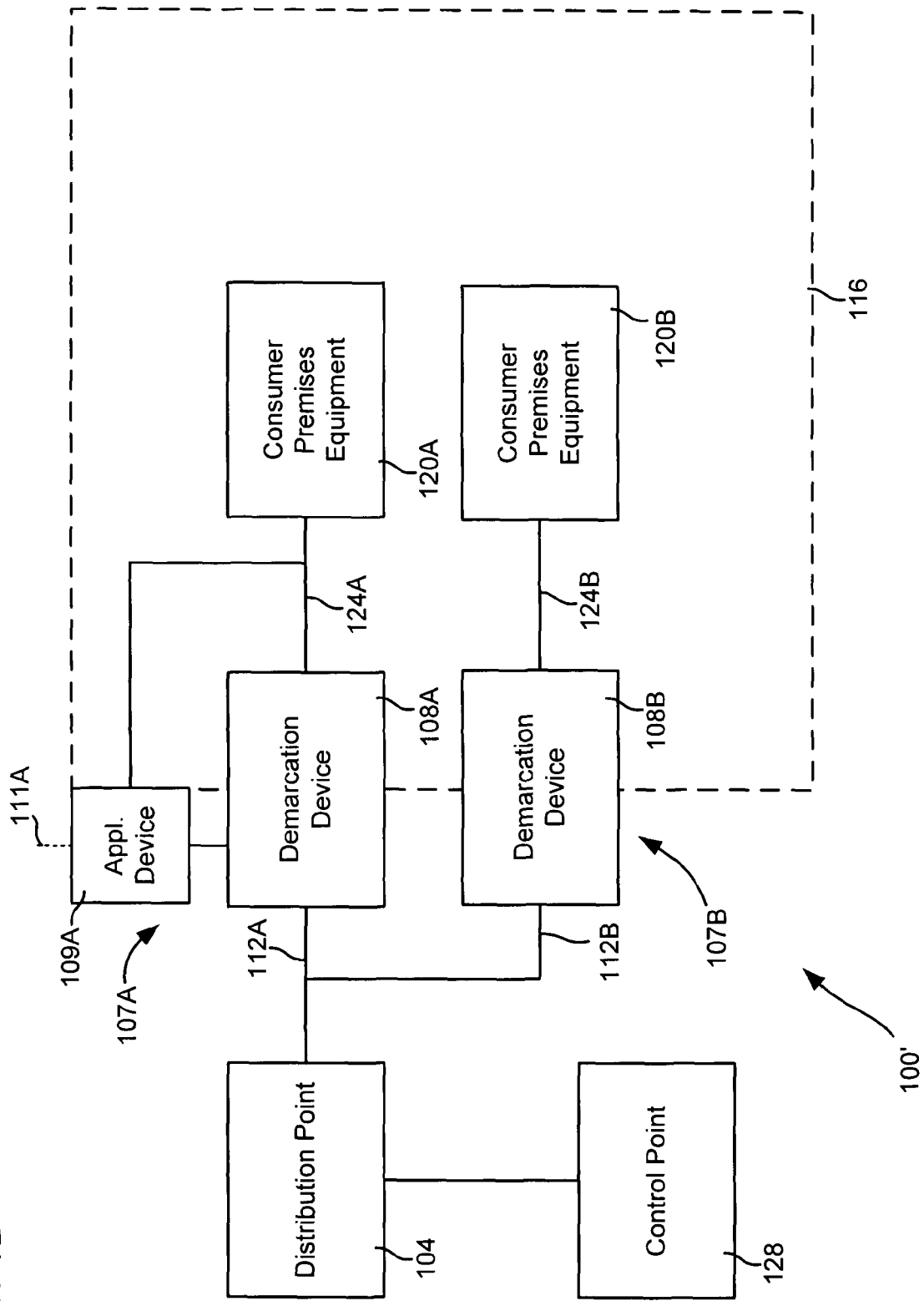

Turning now to FIG. 1B, configuration 100' is illustrative of certain embodiments that can provide multiple NIDs at customer premises 116. A first NID 107A comprises an application device 109A in addition to a demarcation device 108A, while a second NID 107B is shown comprising a demarcation device 108B but no application device. These differences between the two NIDs are intended to illustrate that some functionality may be provided with an application device that is separate from a NID, such as in instances where the application device is instead comprised by the CPE. Alternatively, some functionality may be provided without any application device at all, such as in instances where the one or more microservers comprised by the NID provide all the desired functionality. In the illustration of FIG. 1B, the application device 109A is shown as separated from the corresponding demarcation device 108A, although one or more of the multiple NIDs 107 may alternatively comprise structures in which they are integrated. An example of such integration of an application device with an application device is described in connection with FIG. 1C. In instances where a NID 107 has separated demarcation- and application-device components, the separate components may both be affixed to an exterior wall of the customer premises 116. This has the same advantages discussed previously in connection with NIDs alone, namely ease of upgrading or otherwise changing the network by a telecommunication service provider, but applies also to the application device 109A. In other instances, the separate components may be provided in different locations, such as by providing the demarcation device 108A at a facility operated by the telecommunication service provider while keeping the application device 109A on the exterior wall of the customer premises 116.

The application device 109A may include a service interface 111A for addressing the application device 109A. The service interface 111A may comprise a physical interface, such as a universal serial bus ("USB"), FireWire (IEEE 1394), registered jack 11 ("RJ-11"), registered-jack 45 ("RJ-45"), serial, coax, or other physical interface known to those of skill in the art. In other embodiments, the service interface 111A may comprise a logical interface, such as may be provided through a logical connection with an IP address.

The addressability of the application device 109A may be used in various embodiments to change the state of the application device 109A. Such state information can include any set of data or other information that may be interpreted by the application device 109A as defining operational instructions. This includes, for example, commands to process certain information sets in certain ways, e.g., to provide protocol conversion, to allow transmission of the information set, to deny transmission of the information set, to direct transmission on a particular interface, and the like, as well as commands to provide or cease providing a particular service, such as to provide access to a pay-per-view movie or an additional telephone line. Thus, in certain aspects, a telecommunication service provider can control the telecommunications services provided to a customer in several ways. First, the provider can only transmit a telecommunication information set to a NID 107 if the user of that device is authorized to receive the application service associated with that information set. Alternatively, the service provider could send one or more telecommunications services to a customer's NID 107A, and rely on the state of the component application device 109A to prevent unauthorized access to those services.

Application device 109A may be in communication with CPE 120A through internal transport medium 124A, and implementation of the applications provided by application device 109A can thus be achieved with telecommunication information received and transmitted by demarcation devices 108A. In addition, demarcation device 108A can be in direct communication with CPE 120A through internal transport medium 124A, and demarcation device 108B can likewise be in direct communication with CPE 120B through internal transport medium 124B. Each of the NIDs 107 may be provided in communication with a common distribution point 104 through their respective demarcation devices 108. In particular, demarcation device 108B can communicate with distribution point 104 through external transport medium 112B which, as illustrated by FIG. 1B, can simply be spliced into external transport medium 112A, such as by using an active or passive splitting device, which could be optical, as in a fiber environment, or electrical. If desired, demarcation devices 108 and/or distribution point 104 can include control logic to prevent unauthorized access by demarcation device 108A to telecommunication information sent to or received from demarcation device 108B, and vice versa. In other embodiments, external transport medium 112B could run directly from demarcation device 108B to distribution point 104. In still other embodiments, external transport medium 112B could be omitted, with demarcation device 108B coupled to demarcation device 108A, which could then provide connectivity between demarcation device 108B and distribution point 104 through external transport medium 112A.

Configuration 100' can be used in a variety of implementations. For instance, if customer premises 116 is a multiple-dwelling unit ("MDU"), separate NIDs 107 can be provided for each separate resident or family. Alternatively, a single demarcation device, perhaps with more interfaces, can service multiple dwelling or business units. In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice versa. In some embodiments, demarcation devices 108 can provide a variety of such security, encryption, and authentication functions.

Figure 2A:
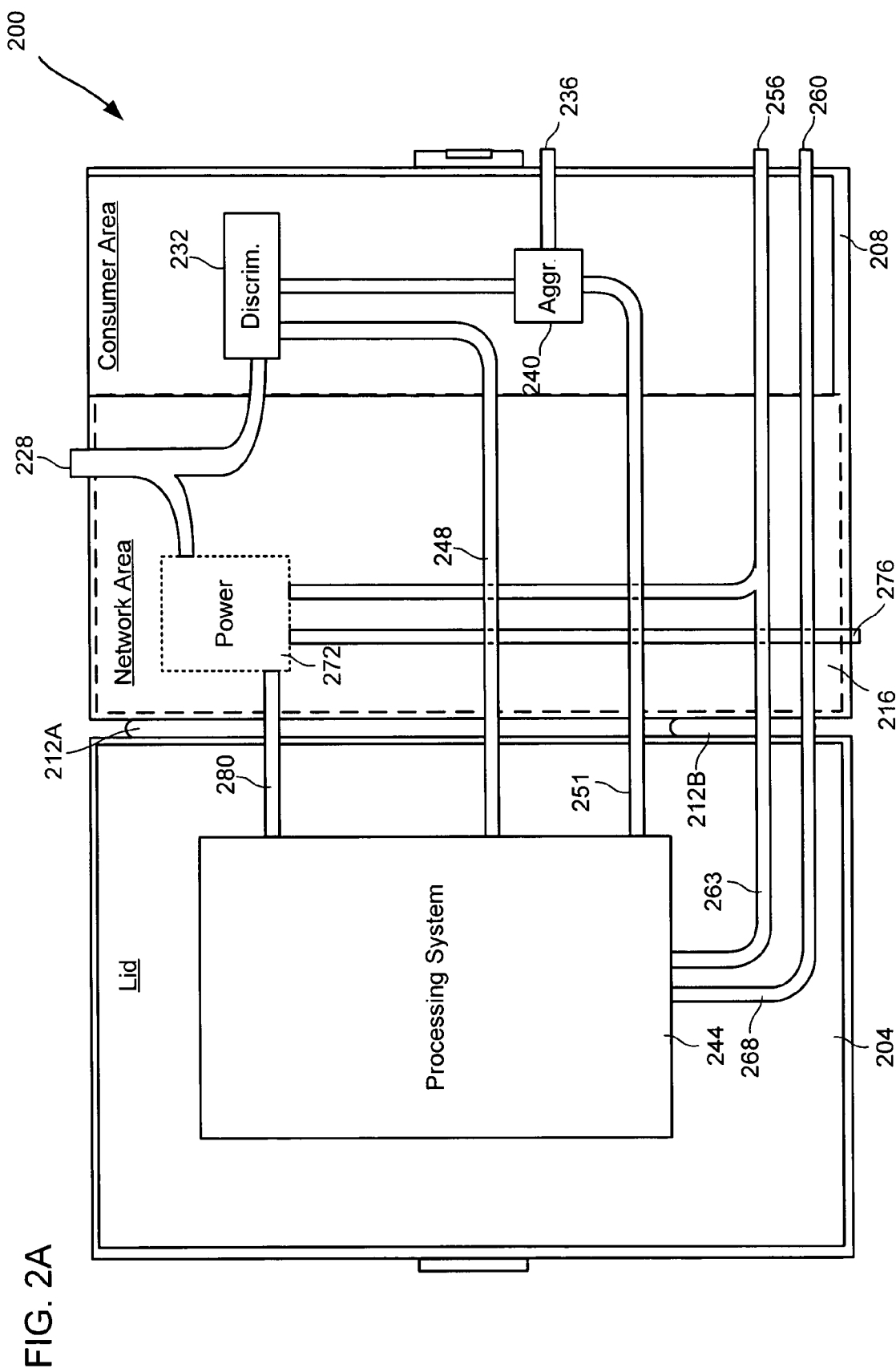
FIGS. 2A-2D provide schematic illustrations of structures of network interface systems according to embodiments of the invention.

The description above provides a specific example of a more general class of embodiments in which multiple NIDs 107 are daisy-chained together, using any of the telecommunication media discussed herein. This allows a telecommunication service provider to provide service to additional customers without requiring any additional external transport media. Similarly, NIDs 107 at multiple premises can be coupled together, such that if the external transport medium coupled to one of the NIDs 107 fails, that device can maintain connectivity to the distribution point through its connection to another NID 107. A NID 107 in accordance with specific embodiments thus may have an interface for securely connecting to one or more additional NIDs 107, and thus forming a mesh network of NIDs and/or distribution points. This allows a particular NID 107 to serve as a conduit between another interface device and a distribution point without allowing any unauthorized reception of telecommunication information intended for the connected interface device. This secure interface can be included, for instance, in a portion of the NID 107 that is inaccessible to customers, as illustrated in FIG. 2A and described below.

Figure 1C:
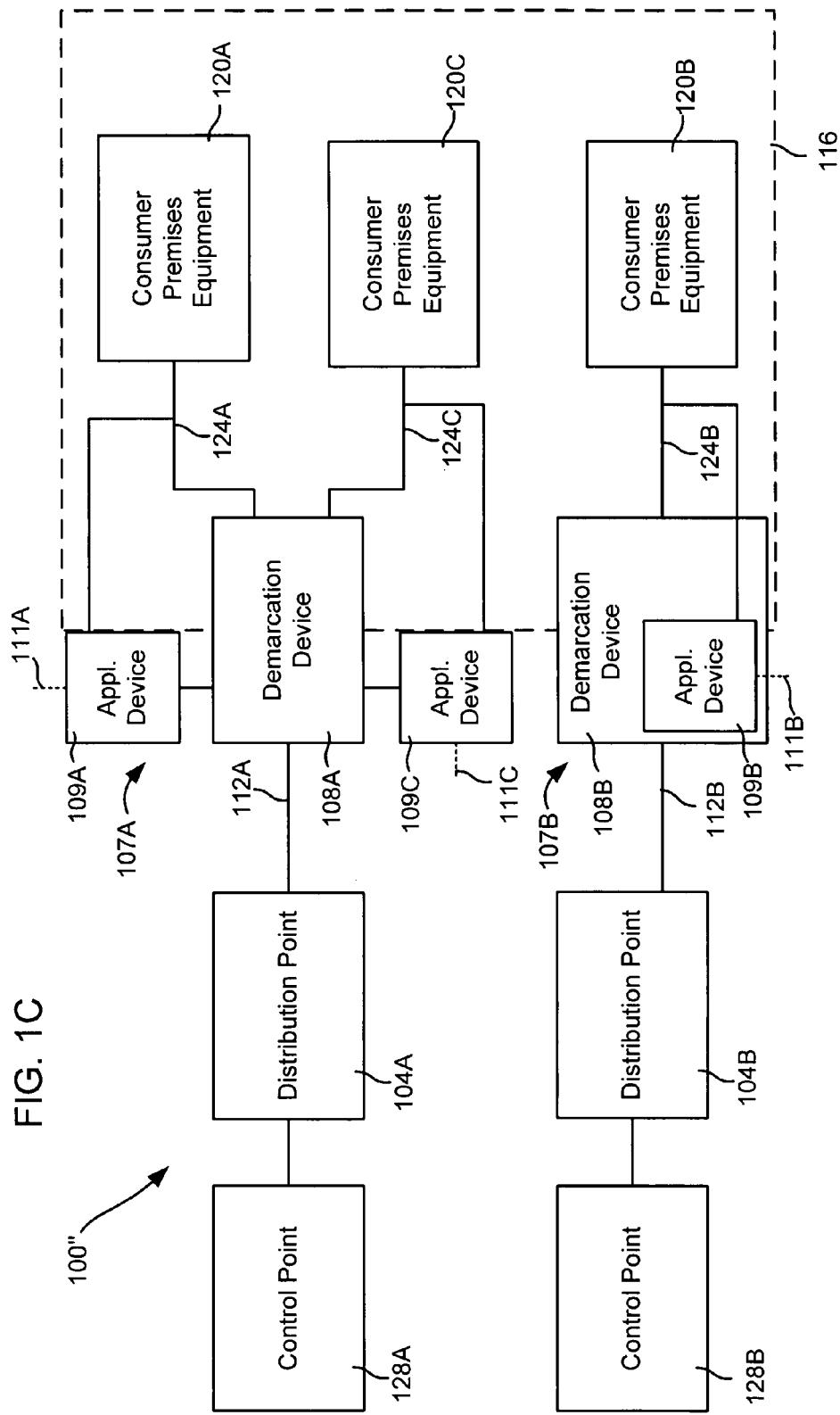

In other embodiments, a single customer premises 116 might have connections to a plurality of telecommunication service providers. For example, turning now to FIG. 1C, configuration 100" includes a distribution point 104A coupled to a first NID 107A via external transport medium 112A and also includes a second distribution point 104B coupled to a second NID 107B via external transport medium 112B. Merely by way of example, distribution point 104B could, for example, be associated with a cable television provider, while distribution point 104A could be associated with a telephone company. In addition, configuration 100" illustrates that multiple CPE 120A and 120C may be coupled with a single NID 107A. This may be done with multiple internal transport media 124A and 124C as illustrated by FIG. 1C, or may alternatively be done through a common internal transport medium as discussed below. Thus, for example, CPE 120A could be a telephone, CPE 120C could be a fax machine, and CPE 120B could be a television.

FIG. 1C further provides an example of combinations of different configurations for the NIDs 107. In particular, the second NID 107B, connected with distribution point 104B, is shown having an integrated demarcation device 108B and application device 109B, with service interface 111B. The first NID 107A, connected with distribution point 104A, is instead shown having separated demarcation and application devices. Moreover, the first NID 107A illustrates a NID that may have a plurality of application devices 109A and 109C in communication with a single demarcation device 108A. Each of these application devices 109A may have a respective service interface 111A and 111C, and may be connected with different internal transport media 124A or 124C to reflect the different application capabilities. Thus, for example, application device 109A could provide an application intended for telephone functions, such as caller identification or call waiting, and application device 109C could provide an application intended for fax functions, such as a storage and retrieval facility. The application device 109B comprised by the second NID 107B could provide an application intended for cable-TV functions, such as a digital recorder function.

Figure 1D:
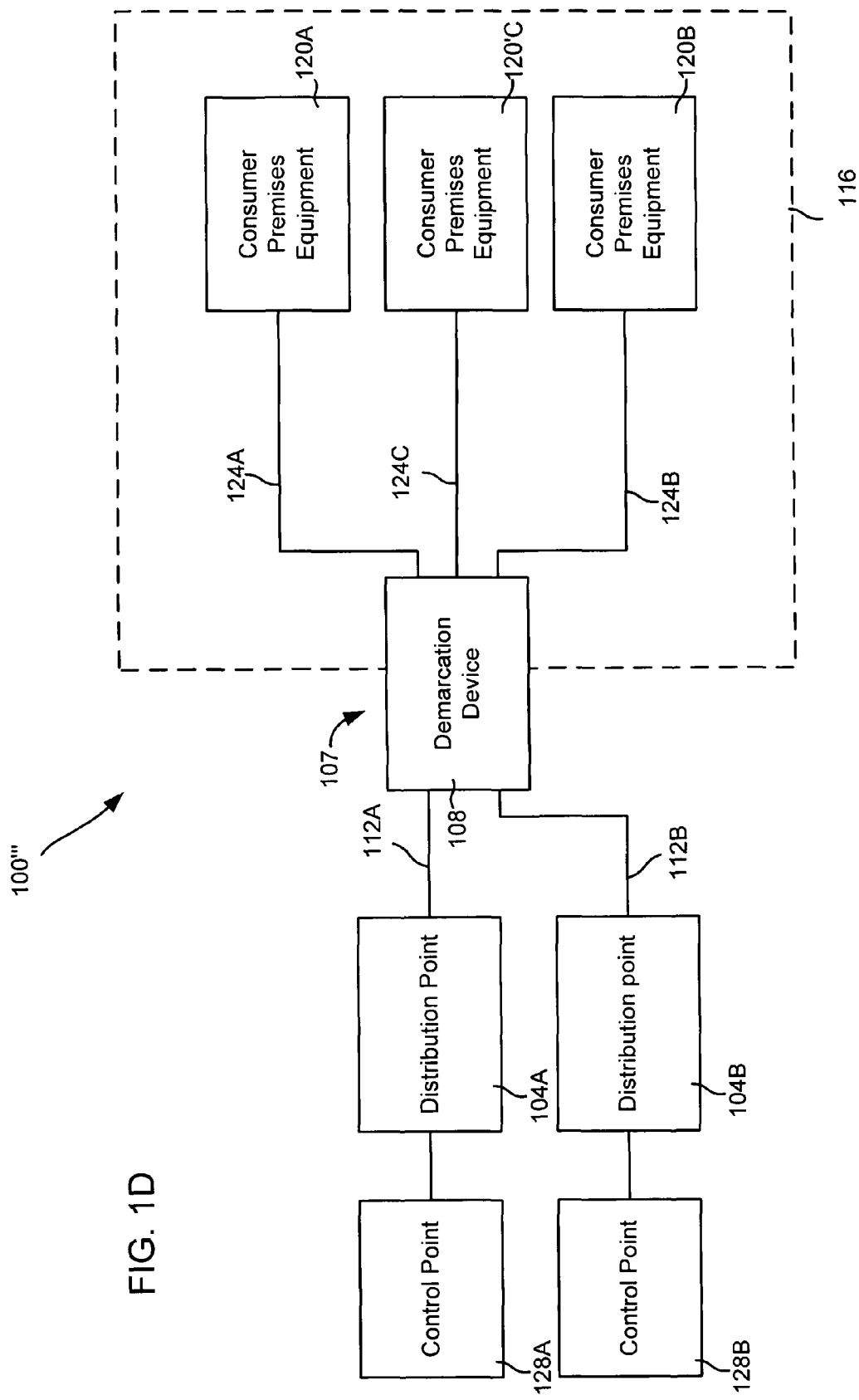

In another alternative embodiment, such as configuration 100''' illustrated in FIG. 1D, a NID 107 can provide connectivity to a plurality of distribution points 104A and 104B, as well to a plurality of CPE 120A, 120B, and 120C. The connectivity of a single NID 107 to a plurality of distribution points 104A and 104B and to a plurality of CPE 120A, 120B, and 120C may be effected through attachments for multiple internal transport media 124A, 124B, and 124C and for multiple external transport media 112A and 112B. Moreover, as illustrated by FIG. 1D, each distribution point 104A and 104B may be associated with a different control point 128A and 128B, respectively. In alternative embodiments, a single control point 128 could provide configuration information to the NID 107 with respect to both distribution points 104A and 104B.

Figure 1E:
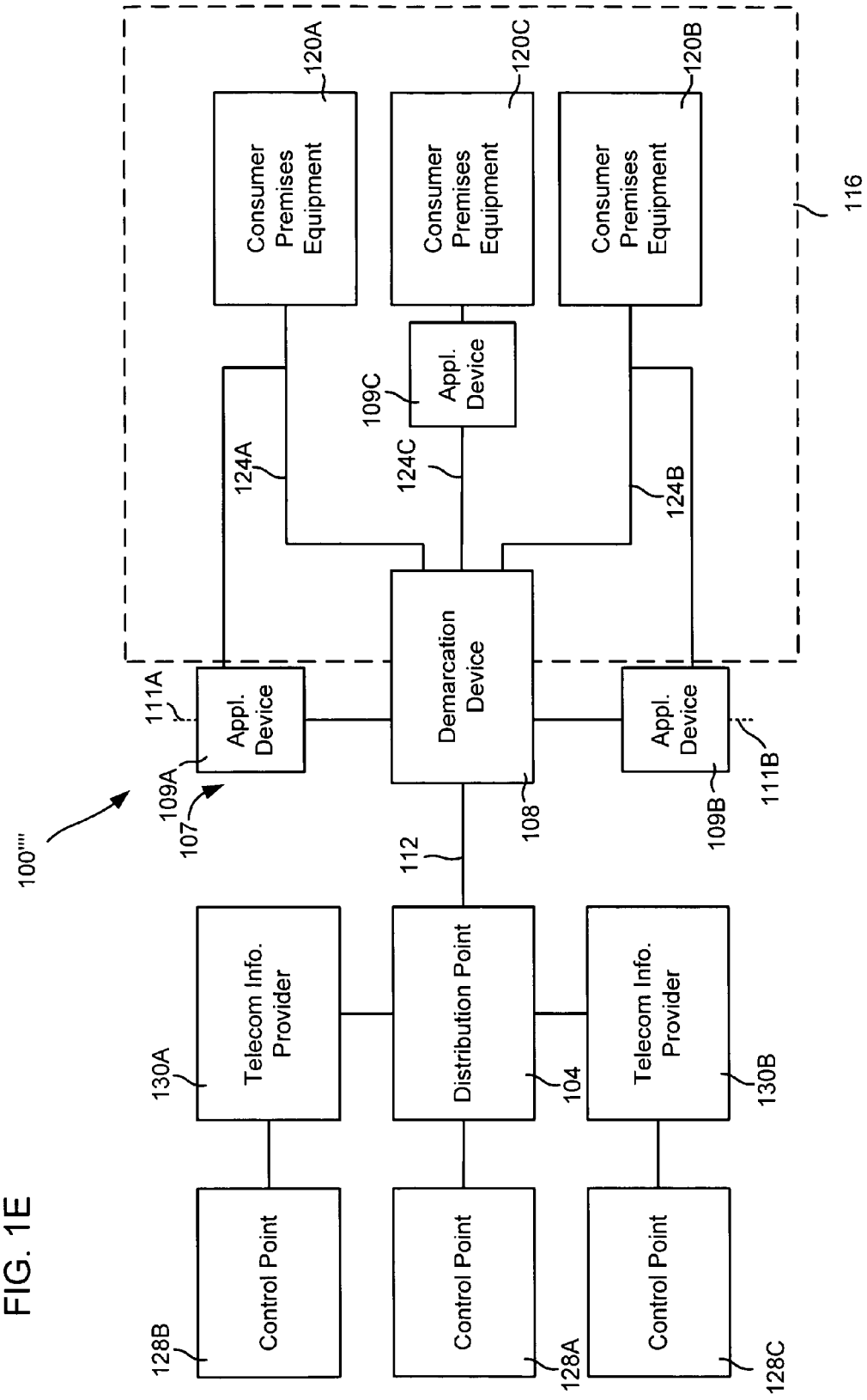

Turning now to FIG. 1E, another exemplary configuration 100'''', is presented in accordance with certain embodiments of the invention. In exemplary system 100'''', the NID 107 is shown having a configuration similar to that of FIG. 1D, but with a plurality of application devices 109 that are provided separate from the NID 107. Two of the application devices 109A and 109B are provided external to the customer premises 116 and have service interfaces 111A and 111B. The third application interface 109C is provide interior to the customer premises, illustrating that it is not a requirement that all of the application devices 109 comprised by the NID 107 be disposed external to the customer premises. Instead of communication of the NID 107 with a plurality of control points 128 being effected through a plurality of distribution points 104, FIG. 1E shows an embodiment in which such communication is achieved with a common distribution point 104. This distribution point 104, which may be operated by a telecommunication service provider, can be in communication with one or more telecommunication information providers 130A and 130B. Each telecommunication information provider 130A and 130B can be the source or recipient of one or more telecommunication information sets, each of which may be associated with a particular telecommunication service. Each of the telecommunication information sets may thus be transmitted to, or received from, the distribution point 104. Distribution point 104 can also transmit these information sets to, or received them from, the NID 107 through demarcation device 108, via external transport medium 112. Such an configuration 100'''' thus exploits a capability of the NID 107 to process a plurality of such information sets in a variety of ways, as discussed below.

In certain embodiments, each telecommunication information provider 130A or 130B may have an individual control point 128B or 128C. In some such embodiments, control points 128B and 128C can be in communication with the NID 107 via distribution point 104 or, alternatively, could have a separate means of communication with the NID 107, such as via a modem and telephone line. Thus, in some embodiments, the NID 107 can receive state information from each control point 128B, and 128C through the demarcation device 108. As discussed above, state information can direct the behavior of the demarcation device 108 and/or application devices 109 comprised by the NID 107, in particular with respect to how to handle telecommunication information to implement various applications on the CPE 120A, 120B, and/or 120C. Such state information may be received by the NID 107 over the external transport medium 112 or through the service interfaces 111A and 111B of the application devices 109A and 109B. In some embodiments, the NID 10 can be configured to accept state information related only to the telecommunication information and/or services provided by the telecommunication information provider sending the state information. In this way, the NID 107 can be protected against inadvertent or malicious misconfiguration, which could interrupt a telecommunication service provided by another telecommunication information provider. Likewise, the NID 107 could be configured to automatically request updated state information from control point 128A associated with distribution point 104 in the case of misconfiguration, and control point 128A could maintain a master set of configuration information to be able to accommodate such a request.

In other embodiments, telecommunication information providers 130A and 130B may not have an associated control point. In such embodiments, telecommunication information providers 130A and 130B can send state information to control point 128A, perhaps via distribution point 104A, and control point 128A can relay that state information to the demarcation device 108 (again, perhaps through distribution point 104). In this way the telecommunication service provider can control which state information is transmitted to the NID 107.

In certain embodiments, the demarcation device 108 can submit a request for state information to one or more control points 128A, 128B, and/or 128C, perhaps via distribution point 104. Such a request might be made if, for instance, the customer would like to watch a pay-per-view movie. The appropriate control point, e.g., 128B, could then provide the proper state information to the NID 107 as described above, allowing transmission of the movie to customer premises 116.

Figure 1F:
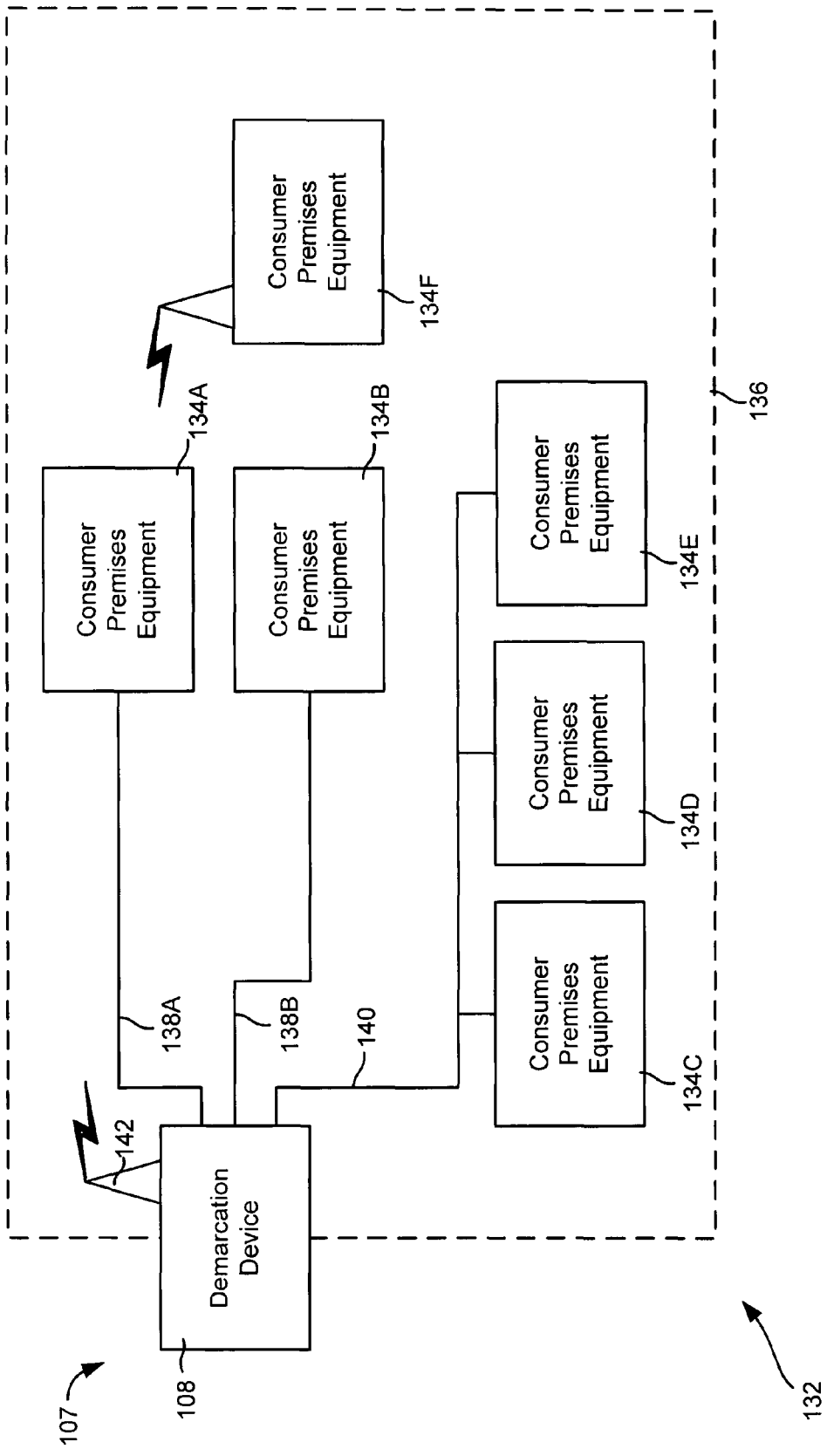

As exemplified by configuration 132 in FIG. 1F, embodiments of the invention enable a single NID 107 to serve multiple CPE 134A-F, each of which can comprise a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by configuration 132, the single NID 107 can support multiple network topologies. For instance, the NID 107 can serve as a hub for a point-to-point network topology, with multiple point-to-point connections to CPE 134A and 134B via internal transport media 138A and 138B, respectively. In addition, the NID 107 can support a bus topology, as illustrated by internal transport medium 140, which can connect the NID 107 to CPE 134C, 134D and 134E. The NID 107 can also be equipped with a wireless transmitter 142 for communication with wireless-capable CPE 134F. In this way, the NID 107 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. The NID 107 can support these and other network topologies, serving as the hub in a 10Base-T network if necessary.

Figure 1G:
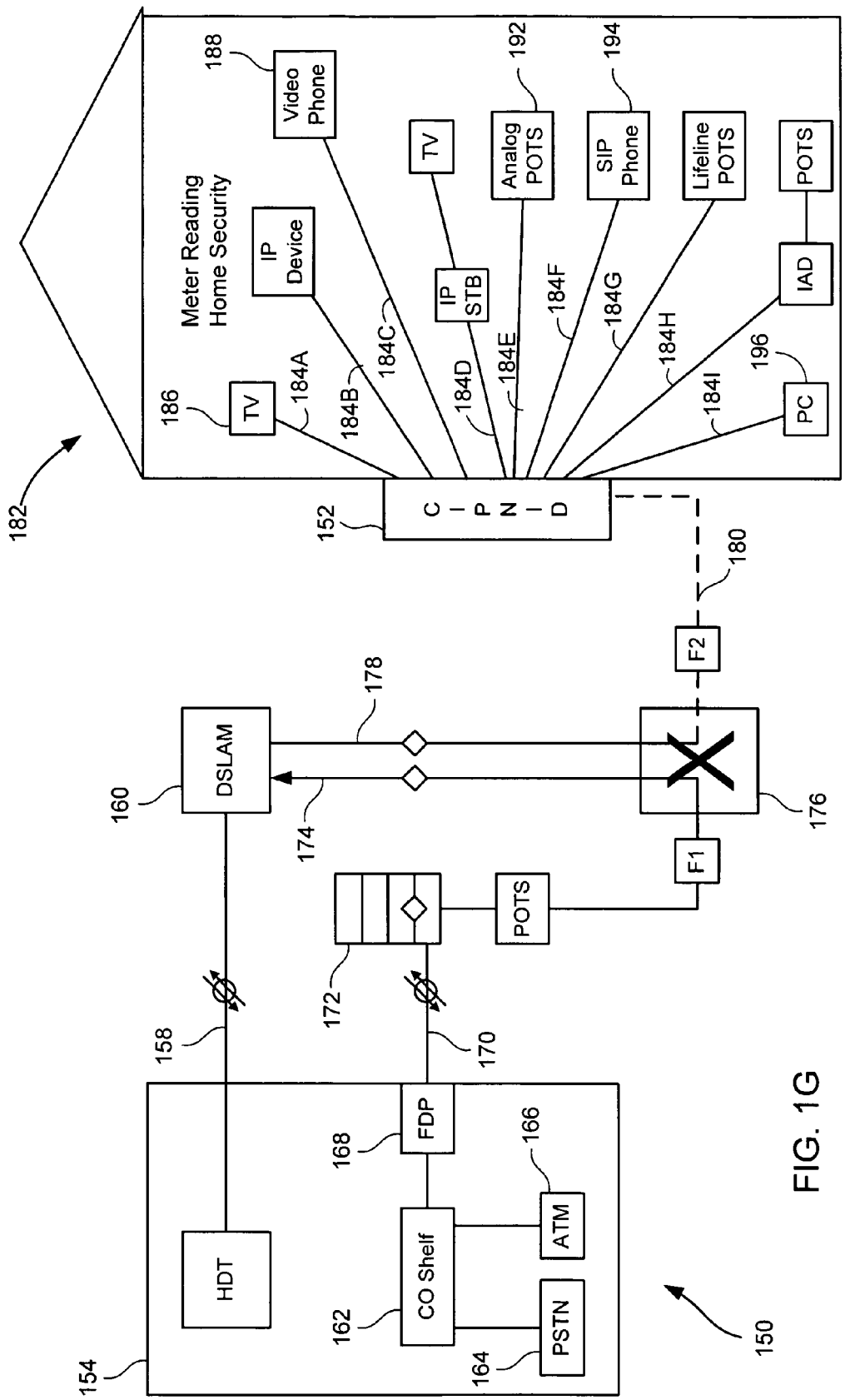

FIG. 1G illustrates another exemplary configuration 150 for using a NID 152 in an xDSL implementation, according to certain embodiments of the invention. In some embodiments, distribution point 154 can comprise a host digital terminal 156 coupled by transport medium 158 to DSLAM 160. As noted above, however, in other embodiments, DSLAM 160 can be considered the distribution point. Host digital terminal 156 can be coupled to any of a variety of data sources and/or recipients, either directly, or indirectly, such as through the provider's network and/or the Internet. In the illustrated embodiment, transport medium 158 can be a Synchronous Optical NETwork ("SONET") link (e.g., OC-3, OC-12, etc.), although those skilled in the art will recognize that other suitable transport media may be substituted.

In accordance with some embodiments, distribution point 154 also comprises a central office shelf 162 in communication with the PSTN 164, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets. As illustrated, these two information sets can be combined at DSLAM 160, which is in communication with serving area interface 176 through transport medium 178. Serving area interface 176 can be coupled to NID 152 with transport medium 180 to provide functionality for various equipment within the customer premises 182. In the illustrated embodiment, the NID 152 is fixedly attached to an exterior wall at the customer premises 182 and is coupled via one or more internal transport media 184A-I to a variety of CPE, including without limitation a television set 186, a video phone 188, an IP-compatible set-top box 190, an analog (POTS) telephone 192, an IP-compatible phone 194, and a personal computer 196. In this way, a NID 151 can be used to provide a plurality of telecommunication services to a customer premises.

2. Structure of Network Interface Device with Microserver

Figure 2B:
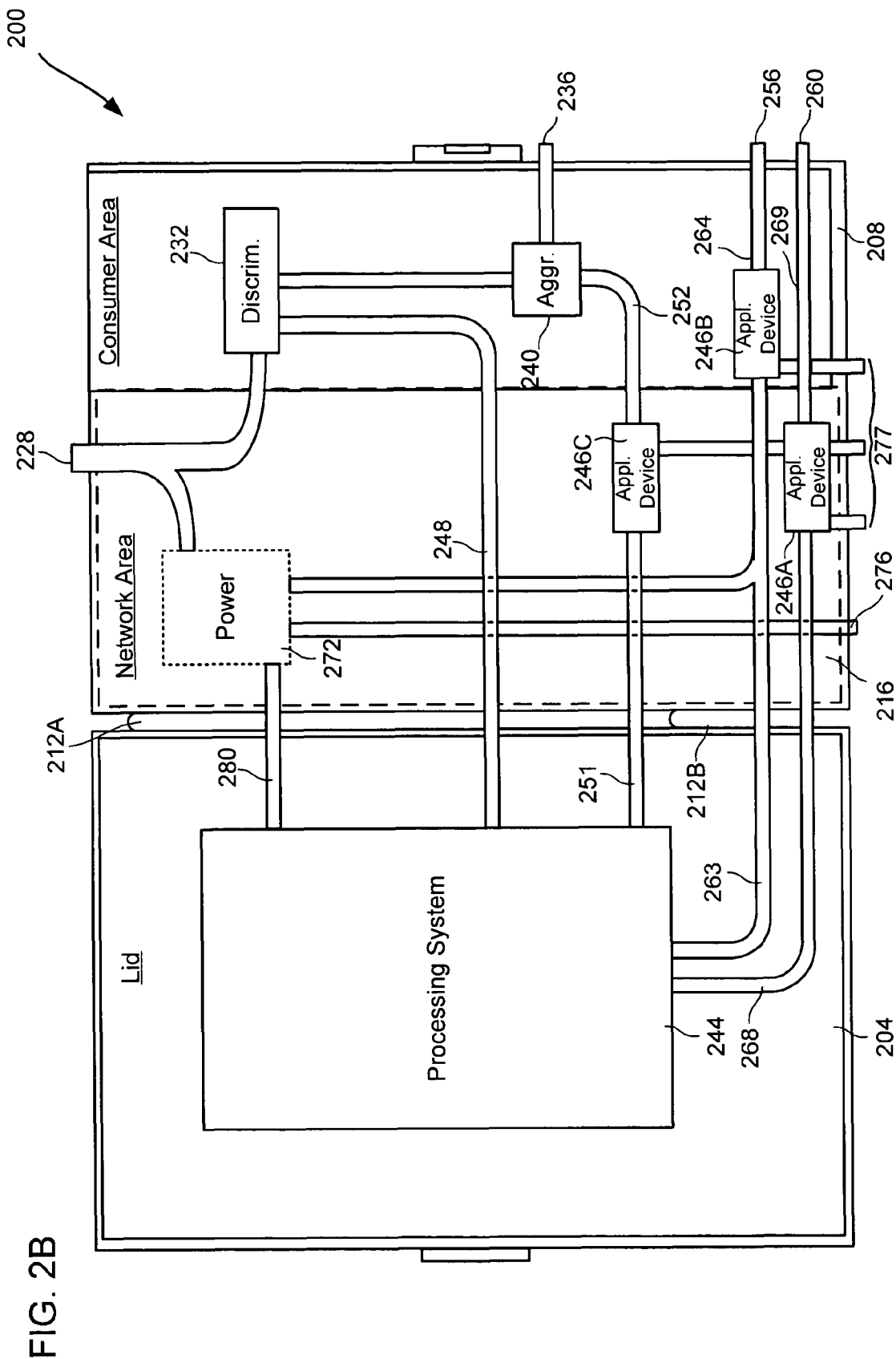
Figure 2C:
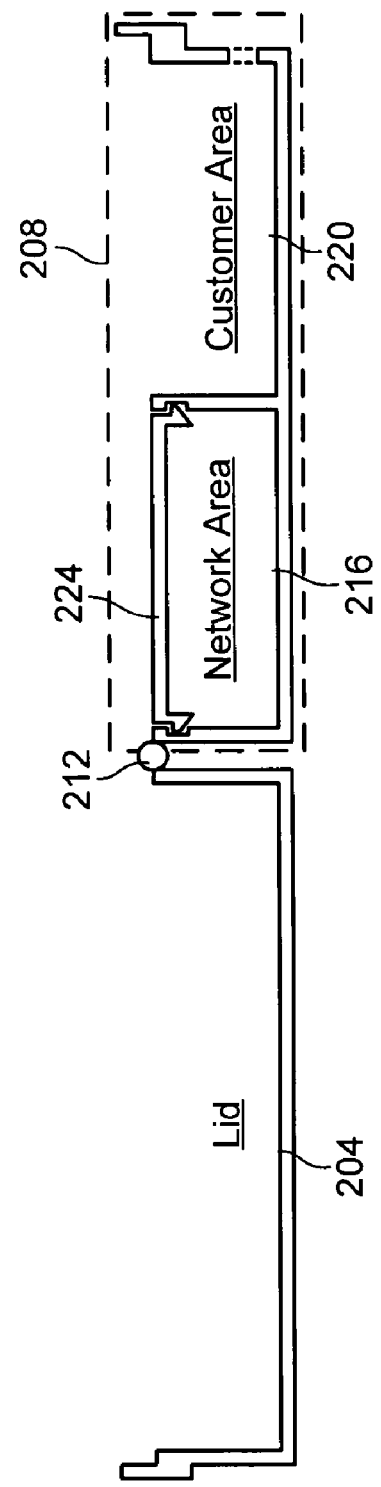

One exemplary embodiment of a NID 200 is illustrated in FIGS. 2A-2C. For purposes of illustration, FIGS. 2A and 2B provide top views that explicitly show components within the NID 200 for different embodiments, while FIG. 2C provides a side view that shows the logical organization of the NID 200 without the components. In the illustrated embodiment, NID 200 comprises a clamshell design, with a lid portion 204 and a body portion 208 connected by hinges 212A and 212B. The body portion 208 comprises a network area 216 and a customer area 220. Generally, network area 216 is adapted to receive a cover and is designed generally to be accessible only to personnel authorized by the telecommunication service provider. In contrast, when NID 200 is open, the customer can access customer area 220 to add or remove components as desired. In this and other ways, the NID 200 serves to isolate the telecommunication service provider's network from the customer's network, as described above.

The NID 200 can include a first interface 228 for communicating with the provider's external transport medium. Those skilled in the art will recognize that, in some embodiments, as described above, the external transport medium may comprise the twisted-pair copper "local loop" running from the customer's premises to the telecommunication service provider's local office, and interface 228 will allow for the attachment of the local loop to the NID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which the NID 200 could include multiple interfaces. In some such embodiments, the NID 200 can function to couple a plurality of external transport media to one another, seamlessly increasing the bandwidth available to the customer premises. For instance, a customer premises might have a satellite link to one telecommunication service provider and an ADSL link to another provider, and the NID 200 could combine or multiplex these two links to provide an apparent single, higher-bandwidth to the customer premises. Similarly, those skilled in the art will recognize that in certain of these embodiments, a particular external transport medium, such as a satellite link, may be more well-suited to one way transmission of telecommunication information; in such cases, the NID 200 could use a second external transport medium, such as an ADSL link, to allow transmission in the other direction.

Interface 228 can be coupled to a discrimination device 232, which can be operative to separate information sets received on interface 228, and, conversely, aggregate information sets for transmission on interface 22). Merely by way of example, in particular embodiments, discrimination device 232 can separate POTS information from other telecommunication information and/or isolate signals on the internal transport medium from the external transport medium and vice versa. In some embodiments, for instance xDSL implementations, discrimination device 232 can comprise one or more filters. Such filters can include, but are not limited to, high-pass, low-pass, and/or band-pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Discrimination device 232 can be operable to separate information sets through a variety of criteria, including for example, by frequency, by destination device, information type, and/or frequency. Further, in certain embodiments, information sets can be multiplexed (for instance, using various time-division multiplexing or wave-division multiplexing schemes known in the art) for transmission over an external transport medium, and discrimination device 232 can comprise a demultiplexer capable of separating multiplexed signals and, optionally, routing each signal to the necessary destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional, perhaps non-POTS, information sets to be sent and received through interface 236 simultaneously with the POTS information. This can include, for example, aggregating information sets for transmission of an HPNA signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, memory devices, including both volatile and nonvolatile memories, and storage devices, including hard disk drives, optical drives and other media. In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and FreeBSD™ operating systems.

Telecommunication information or information sets can be processed by processing system 244 in a variety of ways, including, for example, routing a given information set to a particular interface, transforming information such as by encoding and/or decoding information and converting between different transport protocols, storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality-of-service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, such as those described above with respect to FIG. 1D, a NID may comprise another interface in communication with a second distribution point 104B through an additional external transport medium 112A, perhaps operated by a different telecommunication service provider. In such a case, the additional external interface could be coupled to discrimination device 232, or it could be coupled to another discrimination device, which could also be in communication with processing system 244, interface 236 and/or aggregator 240. Thus, certain embodiments allow a single NID to serve as a communication gateway between the customer premises and multiple telecommunication service providers, including combining or multiplexing multiple external transport media (each of which may be in communication with a different telecommunication service provider and/or telecommunication information provider) as discussed above.

In the illustrated example, processing system 244 is in communication with aggregator 240, which, as discussed above, can aggregate non-POTS information sets received from processing system 244 and POTS information sets received directly from discrimination device 232 for consolidated transmission via interface 236. In effect, discrimination device 232 and aggregator 240, perhaps in conjunction with processing system 244, can function to separate telecommunication information received on interface 228 into a set of POTS telecommunication information and a set of non-POTS telecommunication information. POTS information can be understood to include ordinary telephone signals, and non-POTS information can be understood to include all other telecommunication information). The non-POTS information is routed via transport medium 248 to processing system 244 for processing, and the POTS information is routed to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse, i.e., to separate and recombine different sets of telecommunication information received on interface 236 from the customer's premises. Thus, in some embodiments, both discrimination device 232 and aggregator 240 each can perform a combined discrimination-device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244, and could route information sets among any of those three components as necessary. Moreover, as described below, the functionality of discrimination device 232 and/or aggregator 240 can be incorporated into processing system 244; likewise discrimination device 232 can incorporate interface 228 and/or aggregator 240 can incorporate interface 236, such that discrimination device 232 and/or aggregator 240 comprise the necessary components to be coupled directly to the external and internal transport media, respectively.

Discrimination device 232 and/or aggregator 240 can also serve another function in certain embodiments: Since the external transport medium is coupled to first interface 228 and the internal transport medium can be coupled to, inter alia, second interface 236, the discrimination device 232 and/or aggregator 240 can serve as an isolation device for intermediating between the two media, such that when a topological change occurs in one of the media, only the NID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system 244. In yet other embodiments, the isolation device might comprise a separate piece of hardware in communication with discrimination device 232, aggregator 240 and/or processing system 244.

In different embodiments, the NID 200 may or may not comprise application devices. FIG. 2A illustrates a configuration in which no application devices are provided, with the processing system 244 being provided in communication with interfaces 256 and 260 respectively by transport media 263 and 268, and in communication with the aggregator 240 with transport medium 251. FIG. 2A illustrates an alternative embodiment in which the NID 200 also comprises one or more application devices 246, which are usually disposed in the network area 216. In this embodiment, the application devices 246 are provided in communication with the processing system 244 by transport media 251, 263, and/or 268. In some instances, such as illustrated with application devices 246A and 246B, the application devices may be in communication with interfaces 256 and 260 such as over transport media 264 and 269. Interfaces 256 and 260 allow communication with transport media internal to the customer premises. For example, interface 256 could be a coaxial interface for connection to RG6 and/or RG59 cable, and interface 260 could be an RJ45 and/or RJ11 interface for connection to unshielded twisted pair cable, which can, for instance, form a 10Base-T Ethernet network.

In other instances, such as illustrated with application device 246C, information might be routed from the application device 246C through the aggregator 240. Such an application device may be suitable for applications that use IP data, such as a VoIP application. For example, the NID 200 might receive IP data, perhaps combined with other types of telecommunication information, on interface 228. The information set comprising the IP data can be routed by the discrimination device 232 via medium 248 to processing system 244, where it can be processed. Depending on the embodiment, it could then be routed via transport medium 251 to VoIP application device 246C and then provided to the customer's existing telephone wiring using interface 236, optionally in conjunction with aggregator 240 and/or one or more line drivers. It could alternatively be routed to any of the other application devices 246A or 246B depending on their functionality. In this way, the NID can allow virtually unlimited connectivity options for each CPE at the customer premises. Adding to the flexibility of NID 200, the processing system 244 could include components to serve, for example, as a cable or xDSL modem, as well as components to serve as an Ethernet hub, switch, router, or gateway, the functions of each of which are familiar to those of skill in the art.

Furthermore, the application devices 246 may be provided generally within the network area 216 or in the consumer area 208, or with some in the network area 216 and others in the consumer area 208, depending on the embodiment. This is illustrated in FIG. 2B by showing application devices 246A and 246C disposed within the network area 216 of the NID 200 and application device 246B disposed within the consumer area 208 of the NID 200.

Each of the application devices 246 in the NID may include a service interface 277 to permit states of the application devices 246 to be changed and/or updated. As previously notes, such interfaces may comprise physical interfaces such as USB, FireWire (IEEE 1394), RJ-11, RJ-45, serial, coaxial, or other physical interfaces, to permit a service technician to interact with the application devices 246 while at the site of the NID 200. Alternatively, the service interfaces may comprise logical interfaces to permit IP addressing to be used in changing the state of the application devices. In many instances, the NID 200 may also include a future-application device with open architecture to support new applications. The architecture may be configured by use of the service interfaces 277 when the new application is implemented. Examples of a variety of different application devices 246 that be incorporated within the NID 200 in order to provide a versatile range of functionality are discussed in detail in the '597 application.

In certain embodiments, NID 200 can comprise a line driver (not shown on FIG. 2A or 2B), coupled to processing system 244 and aggregator 240. The line driver can function to allow conversion between various network formats and media, allowing a variety of different media types, e.g., twisted pair and/or coaxial cable, in accordance with the HPNA and HPNA+ standards, as well, perhaps, as the customer premises' A/C wiring, in accordance, for example, with the HomePlug™ standard, to transport combined POTS and non-POTS information sets.

In certain embodiments, NID 200 can comprise a power supply 272 for providing electrical power to the components in NID 200. Power supply 272 can be powered through electrical current carried on the external transport medium and received on interface 228. Alternatively, power supply can receive electrical current from a coaxial interface, such as interface 256, or through a dedicated transformer plugged into an AC outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

Figure 2D:
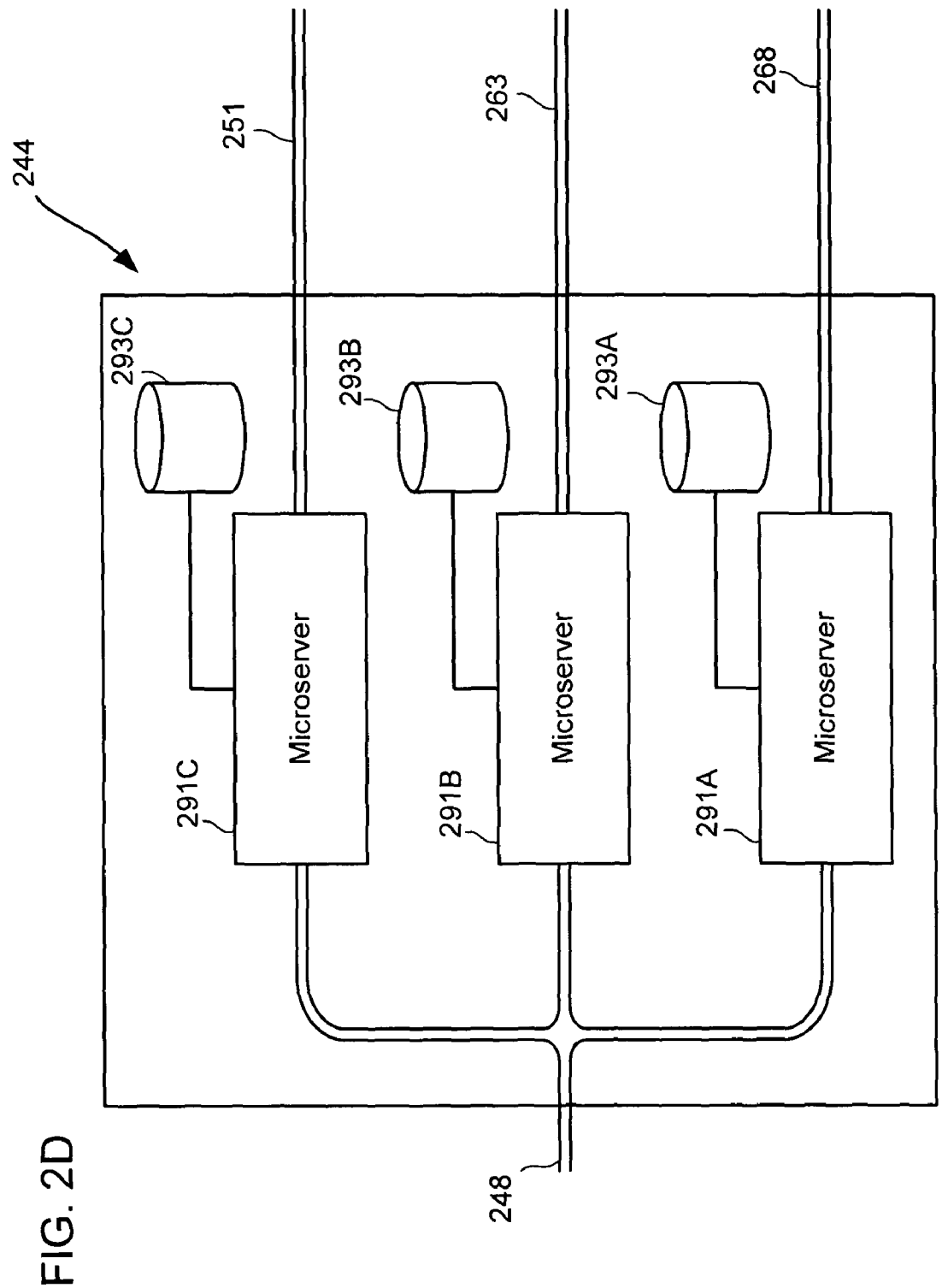

The processing system 244 comprises one or more microservers that use a combination of software and hardware to implement a specified limited set of functions, in addition to other components that may be included such as memory devices, storage devices and the like. Merely by way of example, FIG. 2D provides a detailed illustration of an exemplary processing system 244 that comprises multiple microservers 291. In accordance with the exemplified embodiment, transport medium 248 links processing system 244 with an external transport medium, perhaps via a discrimination device and/or interface, as described above. Transport medium 248 can be coupled to a plurality of microservers 291 such that any information received by the processing system 244 via transport medium 248 may be routed to any of the microservers 291. Each microserver can, in some embodiments, be the equivalent of a server computer, complete with memory devices, storage devices, and the like, each of which is known in the art. In FIG. 2D, storage devices 293 associated with each of the microservers 291 are shown. Depending on the embodiment, each microserver may or may not be associated with an application device to provide information received from transport medium 248 and specifically processed for use by the corresponding device.

In addition to their specific functions, the microservers 291 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microservers 291 can serve switching functions somewhat similar to that described with respect to discrimination device 232 described in relation to FIGS. 2A and 2B. For instance, if IP data are received by microserver 291A, such data can be routed to an Ethernet connection, to the existing telephone wiring, e.g., in an HPNA implementation, or to any other appropriate medium, perhaps via an appropriate line driver. In fact, in certain embodiments, processing system 244, and in particular one or more of microservers 291, can incorporate the functionality of discrimination device 232 and/or aggregator 240, rendering those components optional. In some embodiments, one or more of the microservers may be adapted to function as a controller for the NID 200, overseeing the NID's state and monitoring performance. In some embodiments, the controller functions can be accessed using a web browser.

Processing system 244 can have multiple means of input and output. Merely by way of example, microservers 291 can communicate with one or more external transport media (perhaps, as discussed above, via intermediary devices) using one or more transport media (e.g., 248). Processing system 244 also can communicate with one or more internal transport media via a variety of information conduits, such as category 5, 5e and/or 6 unshielded twisted pair wire 268, RG6 and/or RG59 coaxial cable 264, and category 3 unshielded twisted pair copper (telephone) wire 252, again possibly via intermediary devices, as discussed with reference to FIG. 2B. Notably, some embodiments of processing system 244 can include interfaces for multiple transport media of a particular type, for instance, if processing system 244 serves as a networking hub, switch or router. Processing system 244 can also have infra-red and radio-frequency receivers and transmitters, for instance to allow use of a remote control device, as well as wireless transceivers, for instance to allow wireless (e.g., IEEE 802.11) networking.

3. Microserver Configurations

FIGS. 3A-3L provide a number of exemplary configurations that may be used for the microservers. Each of these figures is intended to illustrate a particular microserver functionality, with it being understood that multiple such functionality may be provided in a particular NID by including of the desired microserver configurations. FIGS. 3A-3L are also drawn to illustrate the functionality schematically by simplifying the illustration of communications within the NID. In particular, the NID is shown comprising a lid portion 204 and a body portion 208, with the microservers located within the lid portion 204, although other locations may be used in other embodiments also. Communication with the NID from the external transport medium is effected with interface 228 and the structure of FIGS. 2A and 2B that routes relevant information to the processing system 244 is indicated generically with network interfaces 302. The manner in which communications between components in the body portion 208 and components in the lid portion 204 are effected is indicated schematically with body-portion bus 304 and lid-portion bus 306, which are themselves in communication. The microservers themselves may be adapted to interface with the NID via a modular design to provide a plug-and-play device.

Figure 3A:
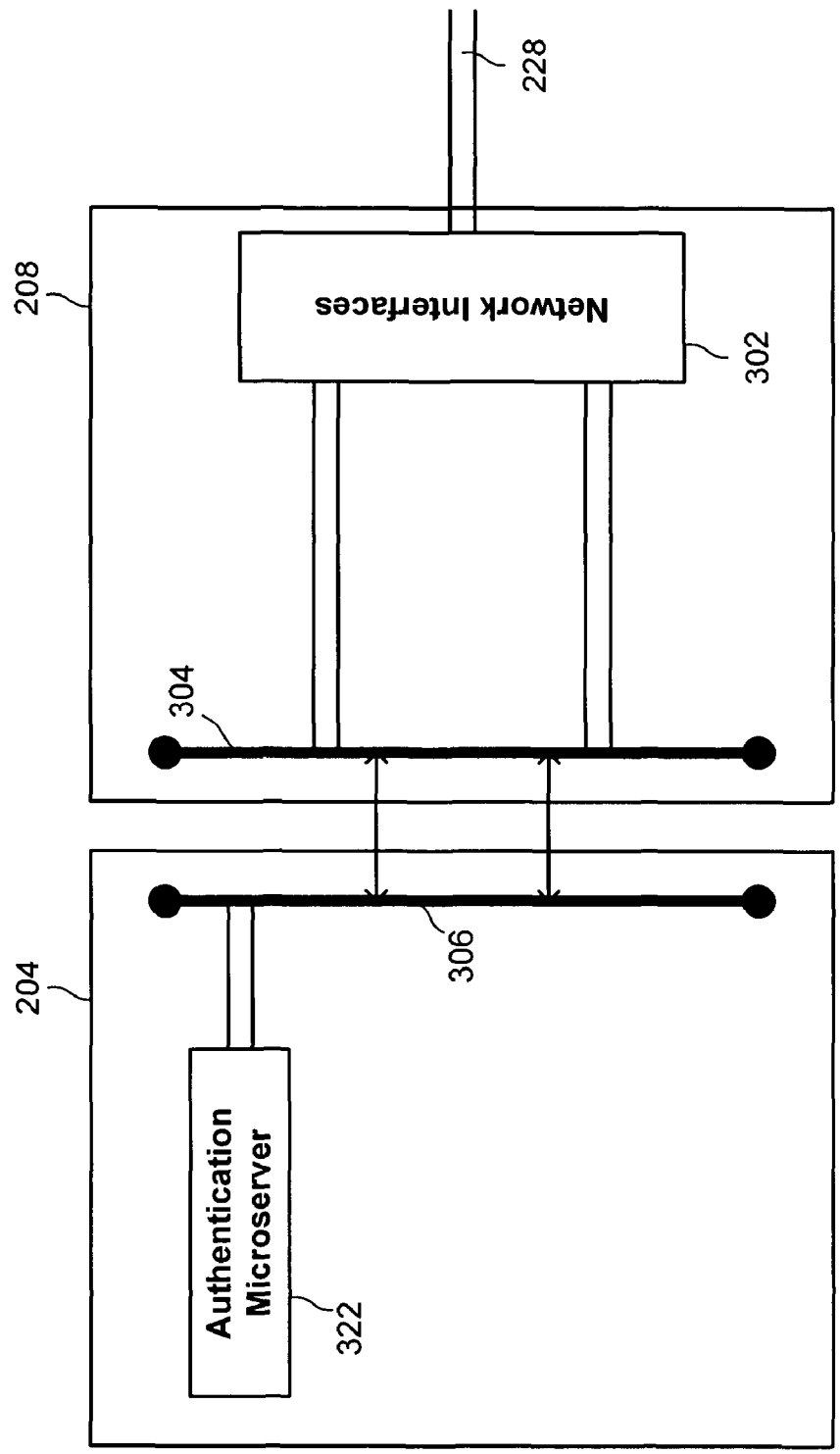

In one embodiment, illustrated in FIG. 3A, the microserver comprises an authentication microserver 322. This is an example of a relatively simple microserver 322 and may be provided in the form of an EPROM, EEPROM, PLD, EPLD, CPLD, FPGA, or the like, together with programming to implement authentication functions. Such authentication functions may be used for verifying that certain functionality of the NID should be enabled for a particular customer. For example, the authentication microserver 322 may provide initial processing of a request for a particular function to ensure that the customer premises is entitled to receive that functionality, such as by comparing records of authorized functions against the request. In response, the details of the specific request may be forwarded by the authentication microserver 322 internal to the NID to other microservers or applications as appropriate.

Figure 3B:
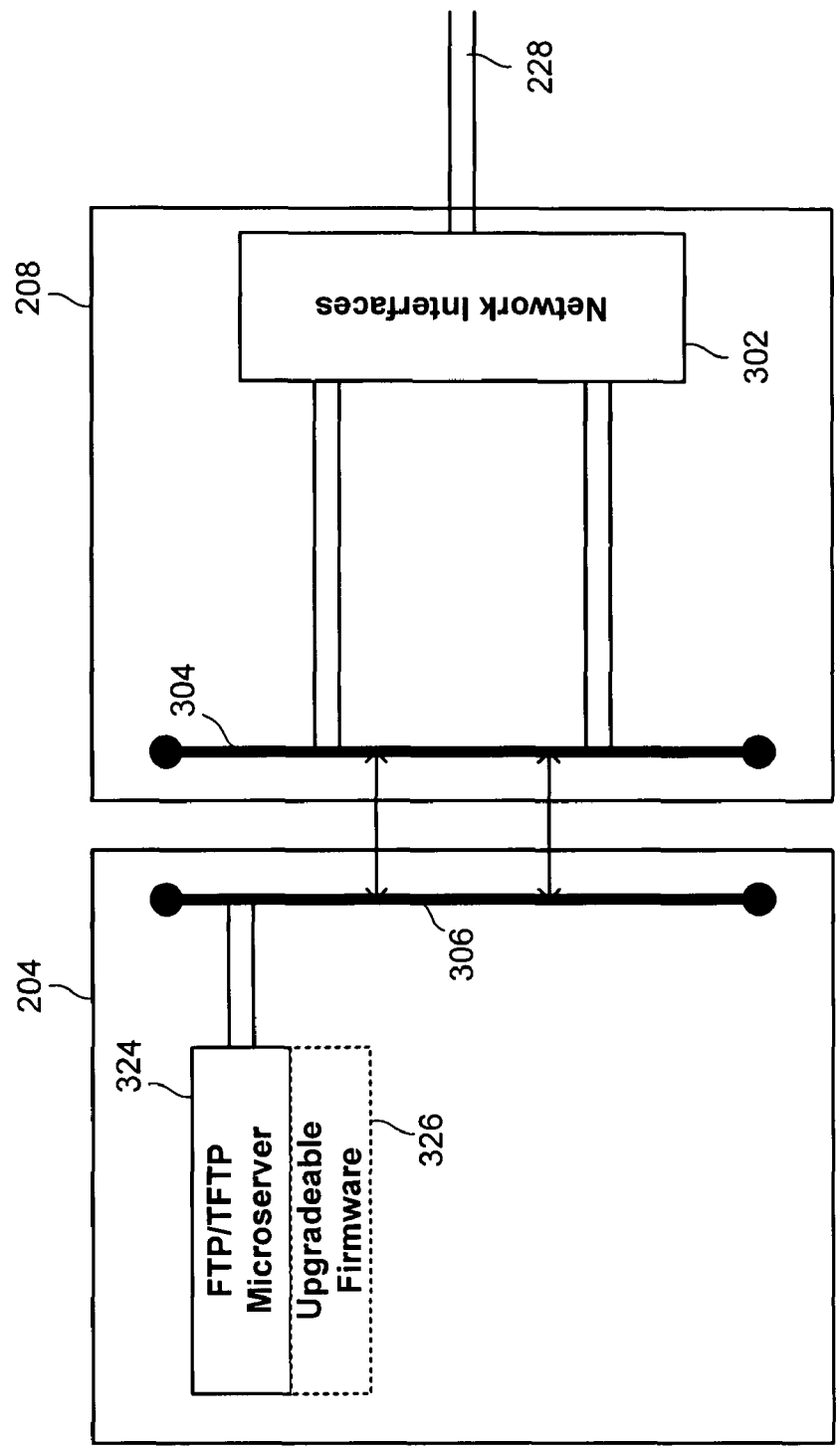

FIG. 3B provides an illustration of a NID that comprises a File Transfer Protocol ("FTP") and/or Trivial File Transfer Protocol ("TFTP") microserver 324. Such a microserver may also be provided in the form of an EPROM, EEPROM, PLD, EPLD, CPLD, FPGA, or the like, together with programming to implement functions that allow for the transfer of information to and/or from the NID. Such information may be organized as an electronic file of information. In some instances, the FTP/TFTP microserver 324 may be provided in communication with firmware 326 comprised by the NID, with information received by the FTP/TFTP microserver 324 taking the form of new-configuration files that define an upgrade for the firmware 326. More generally, the FTP/TFTP microserver 324 may be used for receiving configuration files for any programmable component of the NID, including application devices that may be comprised by the NID and even including other microservers that may be comprised by the NID. The FTP/TFTP microserver 324 coordinates transmission of these configuration files to implement upgrades of functionality of such programmable components. In this way, the inclusion of the FTP/TFTP microserver 324 within the NID provides a mechanism for maintaining a desired level of technological currency for the NID, allowing the support of new software and expanded capabilities as these are developed. Standard communications protocols for effecting FTP and/or TFTP transfers as are known in the art may be used by the FTP/TFTP microserver 324 to implement this functionality.

Figure 3C:
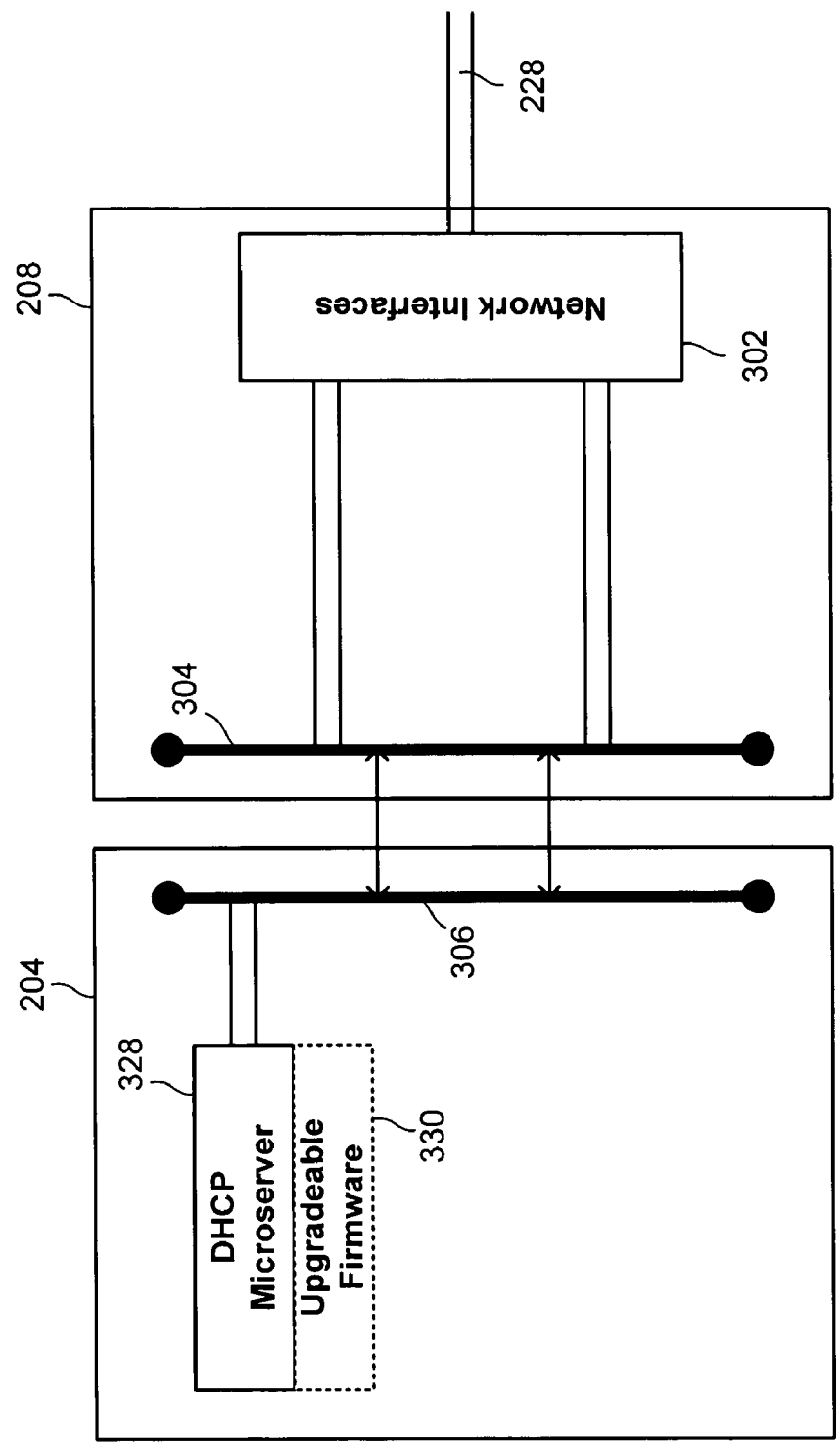

FIG. 3C provides an illustration of a embodiment in which the NID comprises a Dynamic Host Configuration Protocol ("DHCP") microserver 328. Examples of physical structures that may be used to provide the DHCP microserver 328 include an EPROM, EEPROM, PLD, EPLD, CPLD, FPGA, and the like, together with programming to implement functions that allow the assignment of an IP address from the NID. The programming may implement standard DHCP protocols for address assignment as are known in the art. The programming may support public IP address assignment, private IP address assignment, or a combination of public and private IP address assignment, thereby enabling the support of selecting and configuring IP address ranges for a variety of different CPE devices. As a result, the NID may provide network-access capability to these CPE devices for each customer premises. In different embodiments, configuration of the IP address ranges may be performed by the telecommunication service provider or by the customer, perhaps depending on specific characteristics of the telecommunication service being provided. In some instances, the DHCP microserver 328 may also be supported with upgradeable firmware 330 to allow the support of new software and additional capabilities. In instances where the NID additionally comprises a file-transfer microserver, such as the FTP/TFTP microserver 324 described in connection with FIG. 3B, such new software may be provided to the firmware 330 with the file-transfer microserver.

Figure 3D:
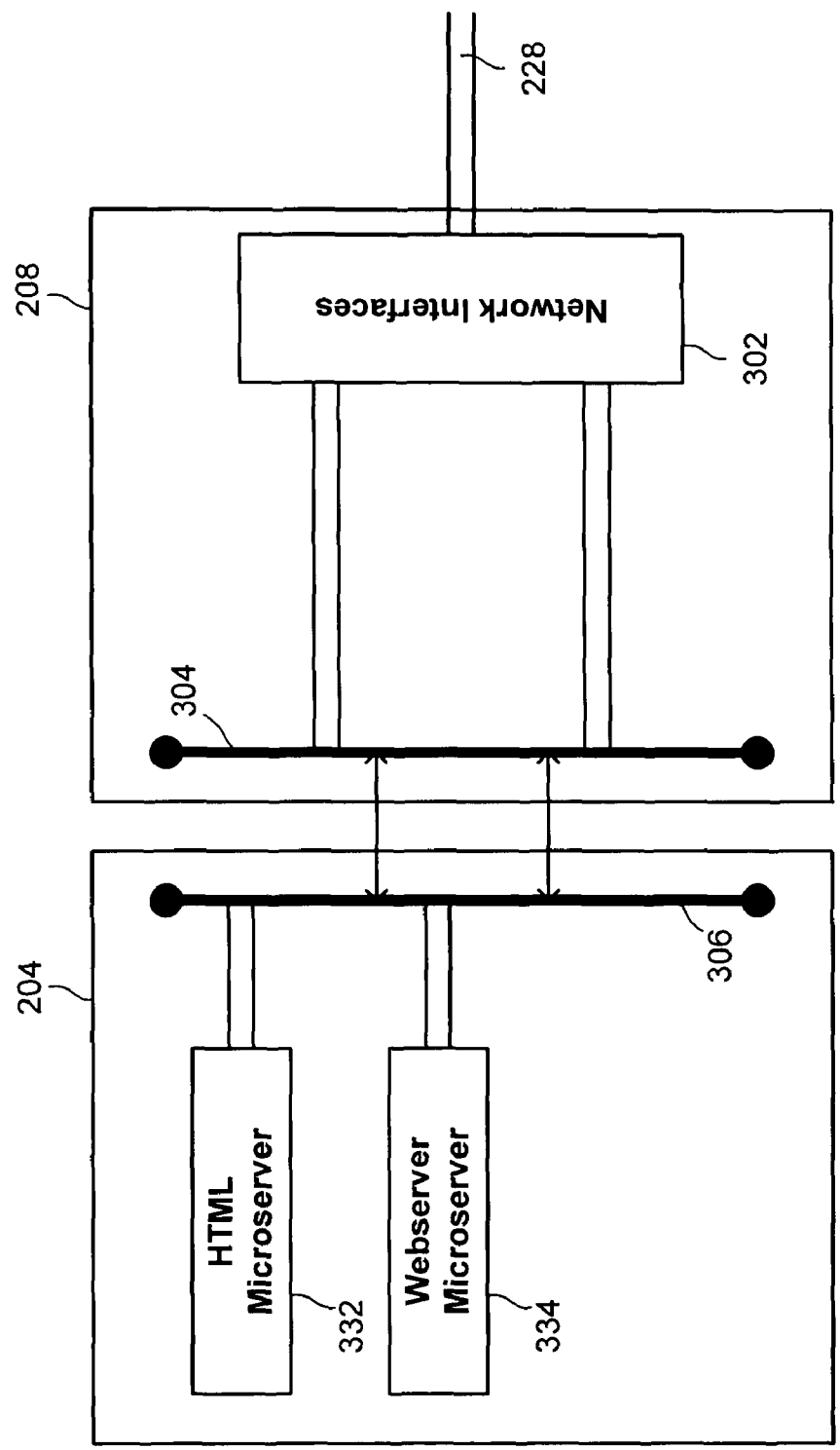

For some applications, a combination of distinct microservers may be appropriate for implementing certain NID functionality. FIG. 3D provides an example in which the NID comprises both an HTML microserver 332 and a webserver microserver 334. Each of these microservers may be embodied with physical structures that allow the implementation of software, such as an EPROM, EEPROM, PLD, EPLD, CPLD, FPGA, and the like. Programming embodied by the HTML microserver 332 allows the processing of HTML code that may be received by the NID according to well-known protocols. A variety of equivalent microservers may be substituted in alternative embodiments to process other types of code or computer languages, such as microservers for processing. Such microservers are described generically herein as "code-processing microservers." The discussion herein of processing HTML code is intended to be exemplary and to limit the scope of the invention.

The processed code may then be transmitted to the webserver microserver 334, which includes software for rendering a display of incoming web-page information suitable for presentation with a web-browser enabled device. In order to effect such rendering, the software comprised by the webserver microserver 334 may provide a configuration for the NID and configurations for application devices that may be integrated with or in communication with the NID. The combination of the HTML and webserver microservers 332 and 334 thus allows for both hardware and software configuration changes to be made to the NID with a customer-based graphic-user interface ("GUI"). A NID equipped in this fashion may therefore be used by a customer to effect customer-premises and access network changes, to modify IP configurations, to initiate and update registration of application devices integrated with or in communication with the NID, and the like. The webserver microserver 334 may be adapted to support a variety of different codes, usually corresponding to the codes or computer languages processed by a code-processing microserver comprised by the NID. In some instances, the HTML microserver 332 and/or the webserver microserver 334 may be supported with upgradeable firmware (not shown in FIG. 3D) to allow the support of new software and additional capabilities. In embodiments where the NID additionally comprises a file-transfer microserver, such as the FTP/TFTP microserver 324 described in connection with FIG. 3B, the new software may optionally be provided to the supporting firmware with the file-transfer microserver.

Figure 3E:
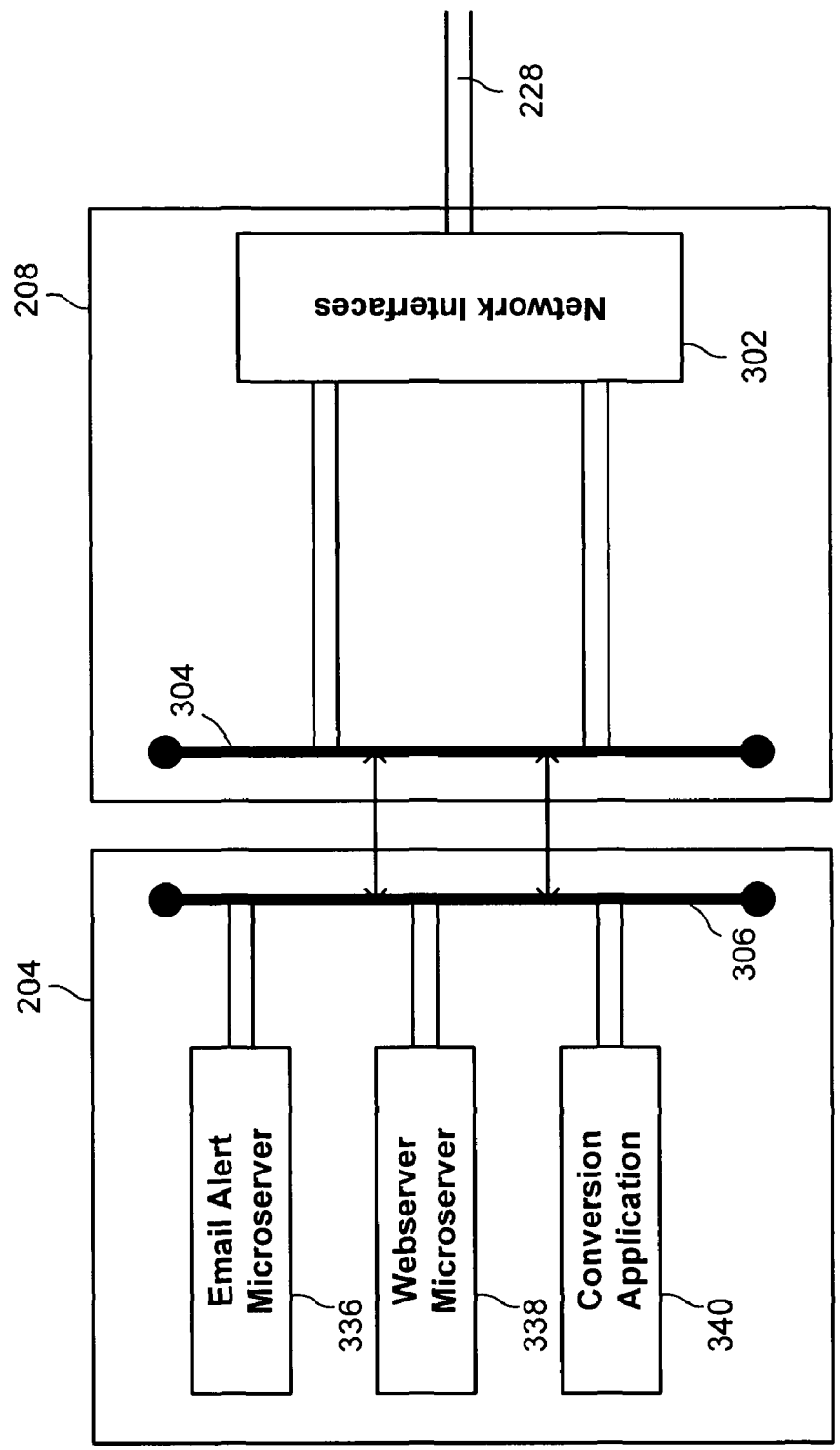
Figure 3F:
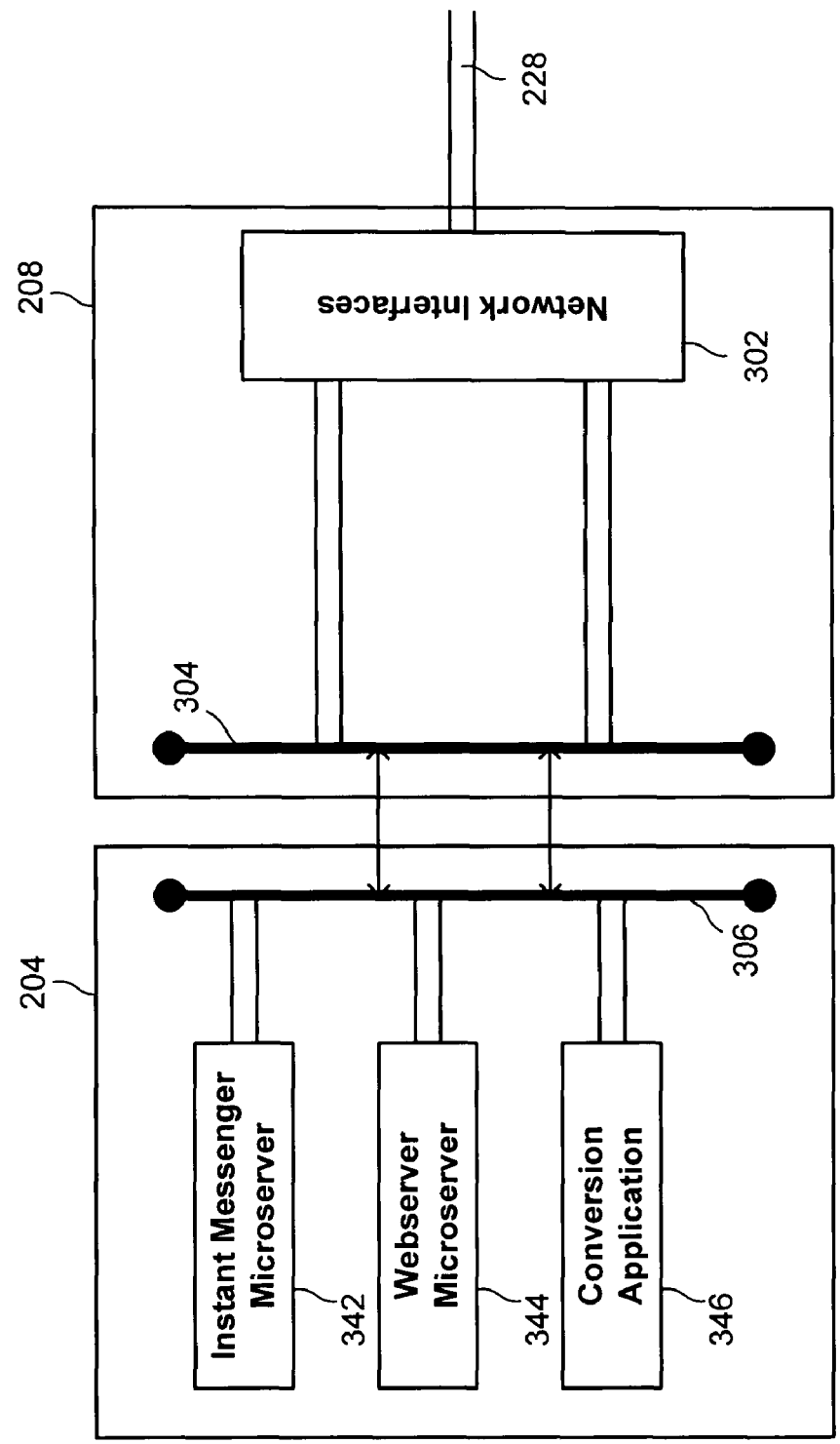
Figure 3G:
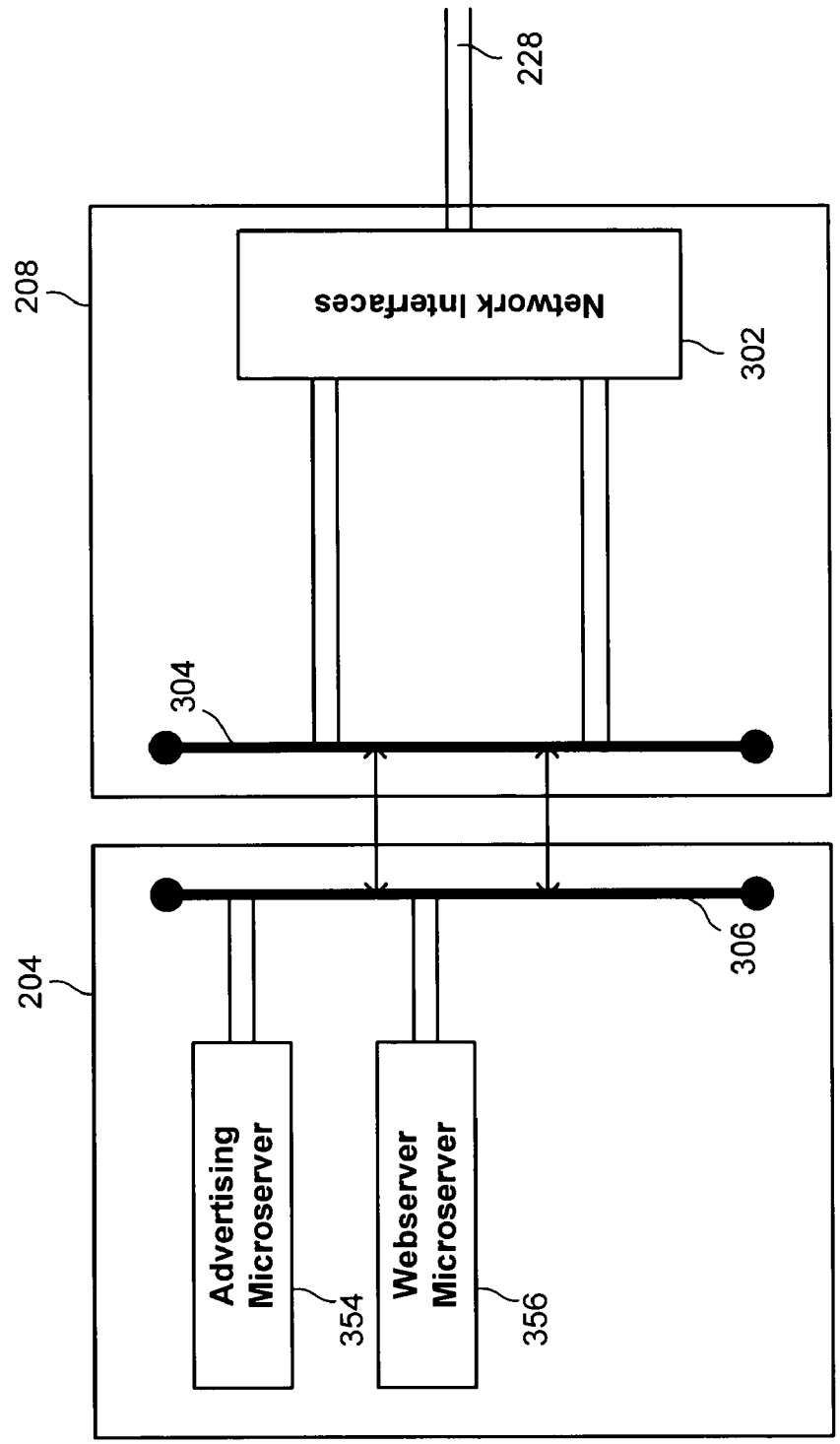

Other combinations of multiple microservers that include a webserver microserver to implement still other functionality are illustrated in FIGS. 3E-3G. In FIG. 3E, an email alert microserver 336 is provided in combination with a webserver microserver 338, both of which may again be provided with physical structures that include an EPROM, EEPROM, PLD, EPLD, CPLD, FPGA, and the like. The email alert microserver 336 includes software that monitors a set of defined email accounts, such as email accounts for users at a specific customer premises, and that initiates an alert when a new message is received by one of those accounts. The alert is transmitted by the email alert microserver 336 to any device within the customer premises configured for receipt of alerts. Such an arrangement thus permits a variety of different devices to be used in the customer premises as email alerting devices, including not only devices such as a personal computer or television, but any device that may be in communication with the NID even if it is not a device normally used for receiving email. The webserver microserver 338 permits implementation of a customer-based GUI that allows for software configuration changes for the email alert microserver 336 to be effected conveniently. In alternative embodiments where a file-transfer microserver is comprised by the NID, such as the FTP/TFTP microserver 324 described in connection with FIG. 3B, software configuration changes may be effected through transfer of an electronic file. Also, in some embodiments, upgradeable firmware (not shown in FIG. 3E) may additionally be provided to support the email alert microserver 336 and/or webserver microserver 338. In cases where the alert is transmitted to a device that may receive the email message, an option may be provided to allow a user to choose to read the email message. In such instances, the email message may be transmitted to a conversion application 340 for conversion to a readable format before it is transmitted to the device where it is read.

In FIG. 3F, a similar arrangement is used to provide an instant-messenger client to a customer by including an instant-messenger microserver 342 in the NID in combination with a webserver microserver 344. In this instance, the microservers may be embodied physically with an EPROM, EEPROM, PLD, EPLD, CPLD, FPGA, or the like, with the instant-messenger microserver 342 having software for implementing messenger-client functions. A conversion application 346 allows received messages to be converted to readable formats for transmission to devices within the customer premises. A user has the option of responding to the message or ignoring it. Typical instant-messenger functionality that may be supported by the instant-messenger microserver 342 may include a login/logout facility, a capability to edit a personal profile, a connect/disconnect facility, a feature for maintaining privacy settings and other preferences information, a facility for maintaining a frequent-contact list, a facility for sending messages, a facility of conferencing multiple users, a chat facility, and the like. An ability to modify the capabilities of the instant-messenger microserver 342 may be provided with a webserver microserver 344 to allow software configuration changes to be effected through a customer-based GUI. More significant capability updates may be effected by providing new software with a file through a file-transfer microserver such as the FTP/TFTP microserver described in connection with FIG. 3B. In some instances, such software updates may be made to supporting firmware (not shown in FIG. 3F) that may additionally be comprised by the NID.

As shown in FIG. 3G, an advertising microserver 354 may be provided in combination with a webserver microserver 356 in some embodiments. Each of the microservers may be embodied physically with an EPROM, EEPROM, PLD, EPLD, CPLD, FPGA, or the like, and the advertising microserver 354 may include software that initiates transmission of advertisement displays to the webserver microserver 356. With such an arrangement, advertisements approved by the telecommunication service provider, perhaps as part of a contractual arrangement with an advertiser, may be downloaded through the NID to the advertising microserver. When a customer is using the webserver microserver 356, the advertisements may then be displayed according to criteria maintained by the advertising microserver 354. Such an arrangement may permit more personalized advertising to be presented to customers.

Figure 3H:
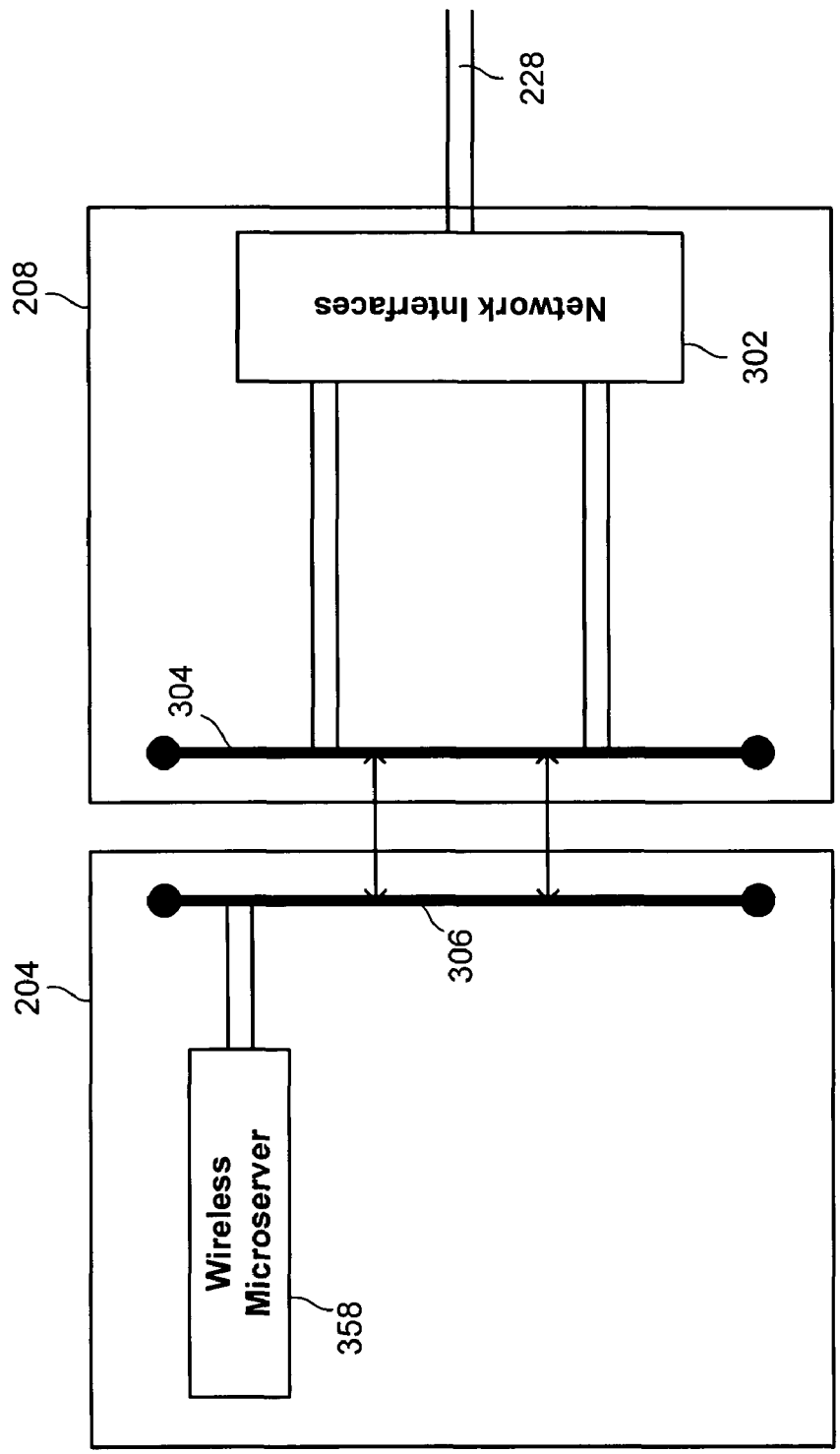
Figure 31:
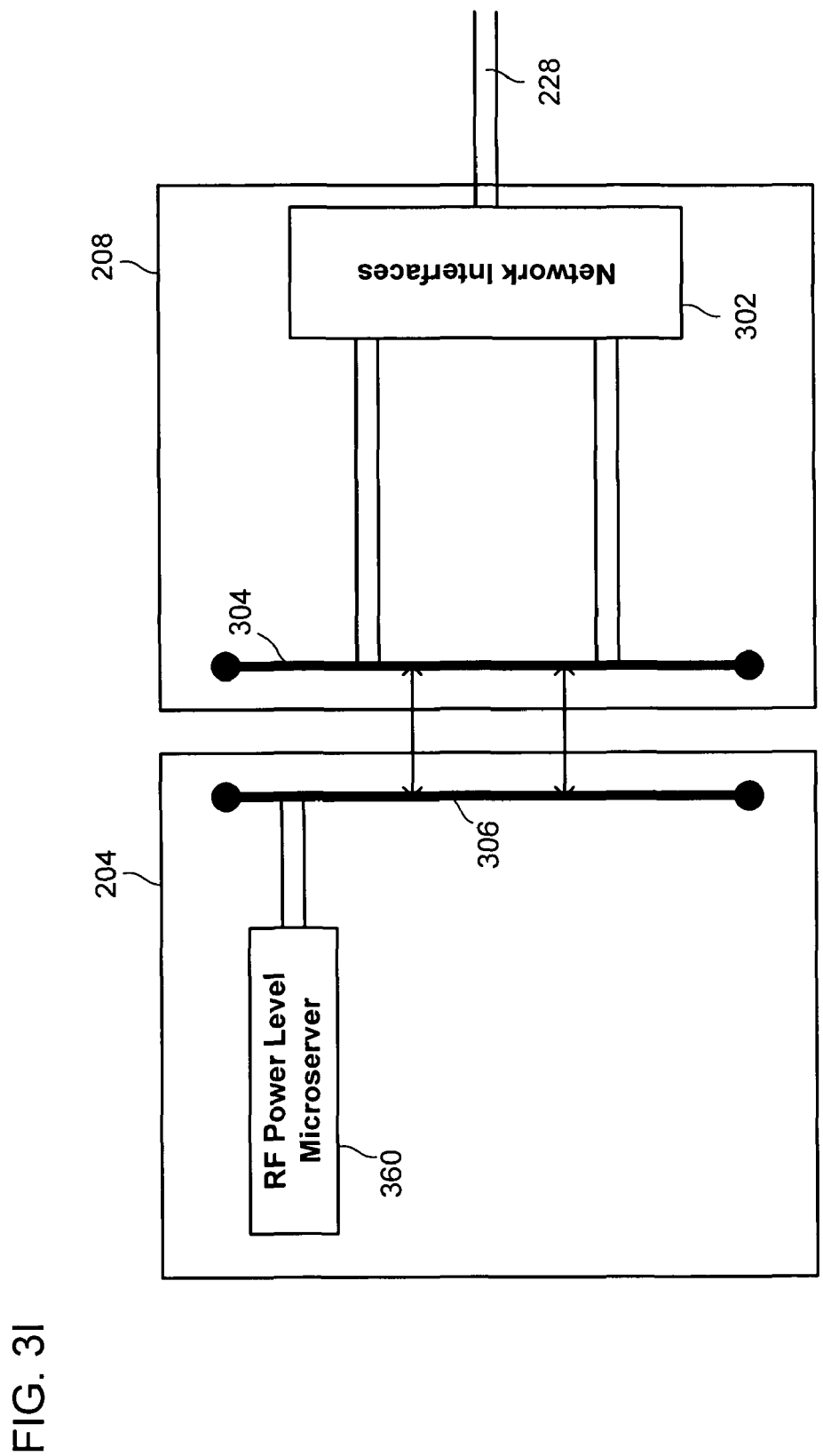

FIG. 3H illustrates an embodiment that makes use of a wireless microserver 358. This microserver may also be embodied physically with an EPROM, EEPROM, PLD, EPLD, CPLD, FPGA, or the like, and includes software for effecting an interface between wireless communications within the customer premises to the network-layer protocols. In this way, the NID may provide support for wireless communications in addition to supporting copper-wire, optical-fiber, and similar communications.

FIG. 3I shows an embodiment in which an RF power-level microserver 360 is comprised by the NID. A combination of hardware in the from on an EPROM, EEPROM, PLD, EPLD, CPLD, FPGA, or the like, with software that measures RF power levels at the NID permits power losses between the network interface and the upstream telecommunication service provider. Such a capability provides a useful diagnostic function in monitoring the transmission of telecommunication information by the telecommunication service provider. For example, failure of an RF television signal that is being provided to a customer premises may indicate the presence of a fault along the transmission path to that customer premises. When multiple NIDs at different customer-premises locations are so equipped, the pattern of power losses may be used to localize the position of the fault. This may be evident, for example, where a first group of customer-premises locations are experiencing power losses while a second group is not, the fault being located where the transmissions to the two group bifurcates.

Figure 3J:
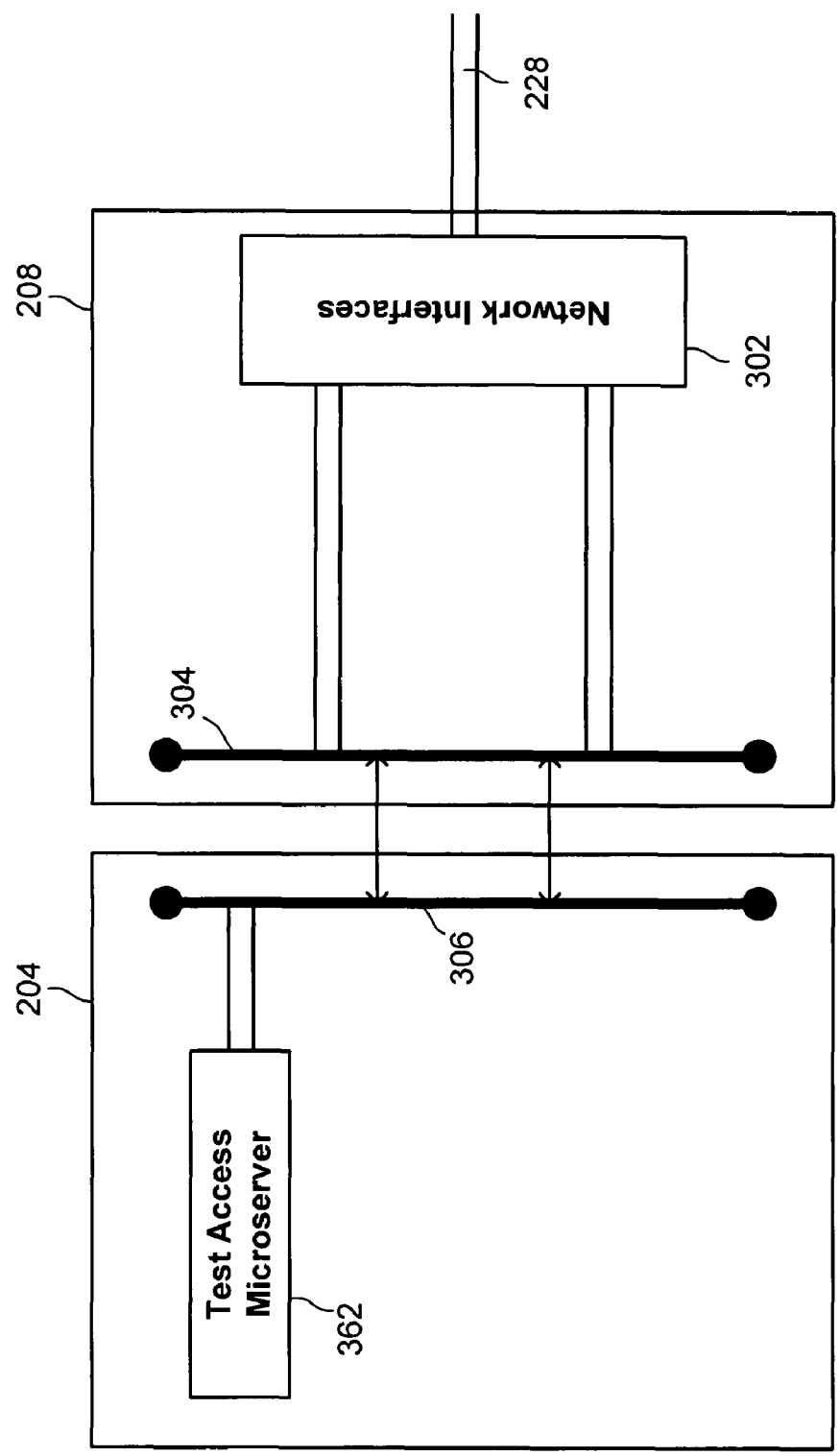

Other diagnostic functions may be provided by other microservers. For example, FIG. 3J shows an embodiment in which the NID comprises a test-access microserver 362. Such a device may include a physical embodiment in the form of an EPROM, EEPROM, PLD, EPLD, CPLD, FPGA, or the like, together with software that implements test functions. The test-access microserver 362 is normally accessible only by a technician and is used to check services being supplied by the NID. Accordingly, the software comprised by the test-access microserver 362 identifies software and/or hardware paths through other microservers, application devices, or other components of the NID to verify correct functionality.

Figure 3K:
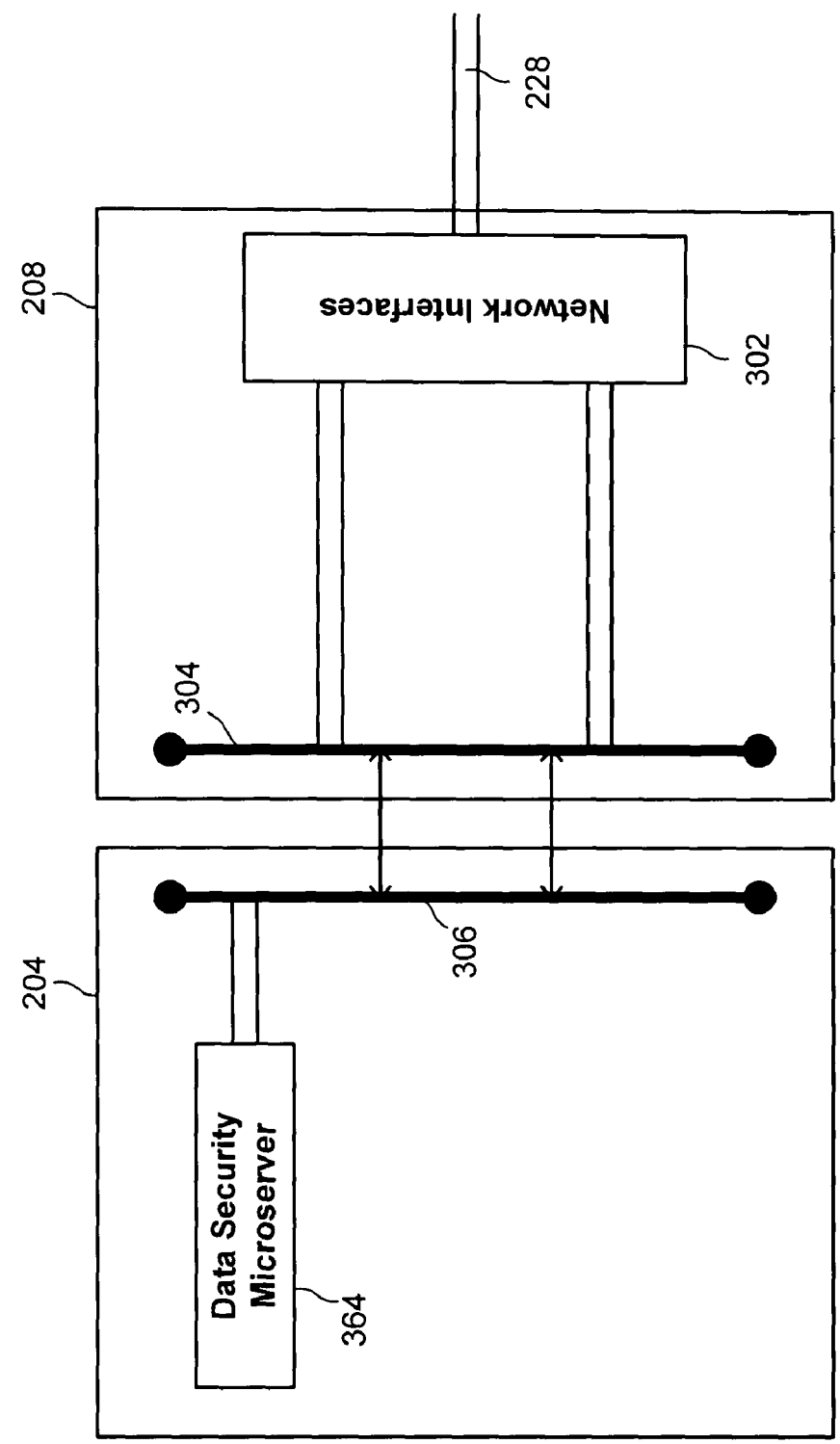

FIG. 3K shows an embodiment in which the NID comprises a data-security microserver 364. Such a device may be embodied in the form of an EPROM, EEPROM, PLD, EPLD, CPLD, FPGA, or the like, with software that allows it to implement security protocols over data that are being stored. Because they are under the control of the telecommunication service provider, these security protocols may be more sophisticated than those otherwise available to customers. The ability for a customer to load data securely to the upstream telecommunication provider for storage offers a convenient mechanism for data storage.

4. Implementation

Other embodiments of the invention include methods for providing telecommunication information to a transport medium internal to a customer premises. In some instances, such methods may make use of the NID structure described above. Several such embodiments are therefore summarized with the flow diagram shown in FIG. 4. Specific details of how each of the steps shown in FIG. 4 may be implemented have been discussed at length above; accordingly, these steps are described only briefly in connection with FIG. 4. As indicated at block 404, the transport media internal to the customer premises and the transport media external to the customer premises are isolated, permitting a flow of telecommunication information between them to be mediated. At block 408, telecommunication information is received from a transport medium external to a customer premises so that it may be selectively processed with a microserver at block 412. A predetermined function is implemented over the internal transport medium with the processed telecommunication information at block 416. As indicated at block 420, in some embodiments the predetermined function may be implemented as an application implemented by an addressable application device. A number of such applications are discussed in greater detail in the '597 application.

Selective processing of the telecommunication information may proceed in a variety of different ways in different embodiments. For example, as indicated at block 424, the telecommunication information may be selectively processed to verify that the predetermined function is one that has been authorized for the customer premises. At block 428, the telecommunication information may be selectively processed by transferring an electronic file of information. At block 432, assignment of IP addresses to one or more devices coupled with the internal transport medium may be managed. At block 436, code may be received and processed for use in implementing the predetermined function. At block 440, the telecommunication information may be selectively processed by rendering a display of incoming web-page information suitable for presentation with a web-browser enabled device. At block 444, an email alert may be initiated in response to receipt of an email message at an email account, and at block 448, instant-messaging functionality may be provided over the internal transport medium. As indicated at block 452, the telecommunication information may be selectively processed to render a display of web-page information for presentation with a web-browser device, and an advertisement may be overlaid over the display at block 456. At block 460, an interface between wireless communications within the customer premises to the external transport medium may be provided with the selectively processed telecommunication information. At block 464, an RF power level of the telecommunication information received from the external transport medium may be monitored to enable localized identification of faults. At block 468, a customer-based GUI may be provided for implementing software configuration changes governing how the received telecommunication information is selectively processed.

Figure 4:
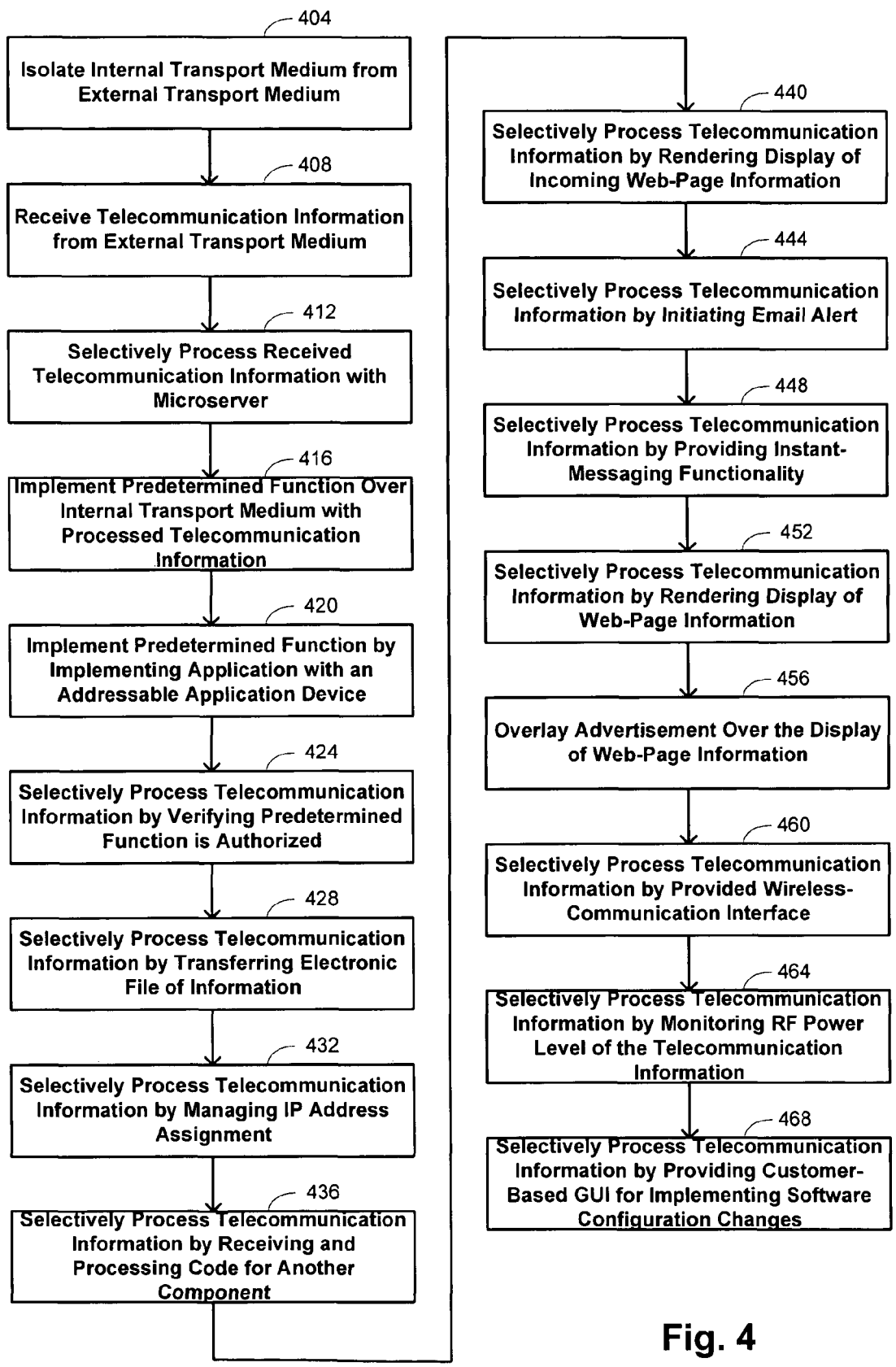
FIG. 4 is a flow diagram illustrating methods of providing telecommunication information according to embodiments of the invention.

Those of skill in the art will appreciate that while the blocks in FIG. 4 are provided in an exemplary order, there is no requirement that respective steps be performed in the order shown. In some embodiments, the respective steps may be performed in a different order. Also, there is no requirement that all of the steps shown in FIG. 4 be performed in a given embodiment since the telecommunication information may be provided to the internal transport medium in accordance with embodiments of the invention by performing a subset of the recited steps.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:
1. A network interface device comprising:
 a body-portion, wherein the body-portion comprises:
  an isolation device adapted to isolate a transport medium internal to a customer premises from a transport medium external to the customer premises such that operational changes to one of the internal and external transport media do not affect the other of the internal and external transport media; and
  a first interface coupled with the isolation device and adapted to communicate with the external transport medium, wherein the external transport medium is in communication with a distribution point;
 at least one hinge coupled to the body-portion; and
 a lid-portion coupled to the body-portion via the at least one hinge such that the body-portion and the lid-portion form a clam-shell design, wherein when closed, the clam-shell design is configured to restrict access to the body-portion and the lid-portion and when opened provide access to the body-portion and the lid-portion, the lid-portion comprising:

a second interface in communication with the isolation device and adapted to communicate with the internal transport medium;

a plurality of microservers disposed external to the customer premises and coupled with the first and second interfaces, wherein the plurality of microservers are adapted to receive information from the external transport medium and includes software and hardware for implementing a first microserver to process the collected data and a second microserver to exchange the data between the internal transport medium and the external transport medium wherein the plurality of microservers are plug-and-play compatible such that any of the plurality of microservers are configured to be able to be added and/or removed from the network interface device at any time and without configuration, and wherein the plurality of microservers are integrated in the network interface device, and wherein at least one of the plurality of microservers comprises a television signal microserver adapted to receive encoded telecommunication information from the external transport medium and to generate television signals from the encoded telecommunication information for transmission over the internal transport medium;

a processor in communication with the plurality of microservers and having software instructions to coordinate transmission of the collected data over the transport medium external to the customer premises;

wherein the isolation device is further adapted to provide communications security by preventing a microserver from accessing communications information which is associated with another microserver; and an addressable application device coupled with the plurality of microservers, wherein the addressable application device is adapted to receive the processed telecommunication information and to execute a defined application as an aid to implementing the functions over the internal transport medium.

2. The network interface device recited in claim 1 wherein the isolation device and the plurality of microservers are disposed within a common housing.

3. The network interface device recited in claim 2 wherein the common housing is disposed on an exterior wall of the customer premises.

4. The network interface device recited in claim 1 wherein the addressable application device is disposed external to the customer premises.

5. The network interface device recited in claim 4 wherein the isolation device, plurality of microservers, and addressable application device are disposed within a common housing.

6. The network interface device recited in claim 1 further comprising an authentication microserver adapted to verify that the microserver functions are authorized for the customer premises.

7. The network interface device recited in claim 1 further comprising a file-transfer microserver is adapted to transfer an electronic file of information to or from the network interface device.

8. The network interface device recited in claim 1 further comprising a dynamic host configuration protocol microserver is adapted to manage an internet-protocol address assignment to a device coupled with the internal transport medium.

9. The network interface device recited in claim 8 wherein the internet-protocol address assignment comprises a public Internet-protocol address assignment.

10. The network interface device recited in claim 8 wherein the internet-protocol address assignment comprises a private internet-protocol address assignment.

11. The network interface device recited in claim 1 wherein the plurality of microservers comprise a code-processing microserver adapted to receive code and process the code for use by another component of the network interface device.

12. The network interface device recited in claim 11 wherein the webserver microserver is adapted to render a display of incoming web-page information suitable for presentation with a web-browser enabled device.

13. The network interface device recited in claim 1 wherein the plurality of microservers comprise an email alert microserver adapted to initiate an alert in response to receipt of an email message at an email account.

14. The network interface device recited in claim 1 wherein the plurality of microservers comprise an instant-messenger microserver adapted to provide instant-messaging functionality over the internal transport medium.

15. The network interface device recited in claim 1 wherein the plurality of microservers comprise: a webserver microserver adapted to render a display of web-page information suitable for presentation with a web-browser enabled device; and an advertising microserver adapted to overlay an advertisement over the display of web-page information.

16. The network interface device recited in claim 1 wherein the plurality of microservers comprise a wireless microserver adapted to provide an interface between wireless communications within the customer premises to the external transport medium.

17. The network interface device recited in claim 1 wherein the plurality of microservers comprise an RF power-level microserver adapted to monitor an RF power level of telecommunication information received at the first interface.

18. The network interface device recited in claim 1 wherein the plurality of microservers comprise a test-access microserver adapted to verify proper functioning of another component of the network interface device.

19. The network interface device recited in claim 1 further comprising a webserver microserver coupled with the plurality of microservers and adapted to provide a customer-based graphical user interface for implementing software configuration changes of the microserver.

20. The network interface recited in claim 1 further comprising upgradeable firmware that supports the plurality of microservers.

* * * * *

UNITED STATES PATENT AND TRADEMARK OFFICE
CERTIFICATE OF CORRECTION

| | |
|---|---|
| PATENT NO. | : 7,793,003 B2 |
| APPLICATION NO. | : 10/624454 |
| DATED | : September 7, 2010 |
| INVENTOR(S) | : Steven M. Casey et al. |

It is certified that error appears in the above-identified patent and that said Letters Patent is hereby corrected as shown below:

Column 10, Line 37, delete "in it network" and insert --in its network--, therefor.

Column 18, Line 56, delete "interface 22)." and insert --interface 228.--, therefor.

Column 20, Line 23, delete "telecommunication information)." and insert --telecommunication information.--, therefor.

Column 21, Line 63, delete "notes, such interfaces" and insert --noted, such interfaces--, therefor.

Column 22, Line 8, delete "be incorporated" and insert --may be incorporated--, therefor.

Column 26, Line 64, delete "the from on an" and insert --the form of an--, therefor.

Signed and Sealed this
Thirtieth Day of August, 2011

David J. Kappos
*Director of the United States Patent and Trademark Office*